United States Patent
Stokes et al.

(10) Patent No.: US 10,444,354 B2
(45) Date of Patent: Oct. 15, 2019

(54) SONAR DATA ENHANCEMENT SYSTEMS AND METHODS

(71) Applicant: FLIR Systems, Inc., Wilsonville, OR (US)

(72) Inventors: Paul Stokes, Fleet (GB); Philip Webb, Fareham (GB)

(73) Assignee: FLIR SYSTEMS, INC., Wilsonville, OR (US)

(*) Notice: Subject to any disclaimer, the term of this patent is extended or adjusted under 35 U.S.C. 154(b) by 330 days.

(21) Appl. No.: 15/638,124

(22) Filed: Jun. 29, 2017

(65) Prior Publication Data

US 2017/0299703 A1  Oct. 19, 2017

Related U.S. Application Data

(63) Continuation of application No. PCT/US2015/067947, filed on Dec. 29, 2015, and a
(Continued)

(51) Int. Cl.
*G01S 7/526* (2006.01)
*G01S 7/52* (2006.01)
(Continued)

(52) U.S. Cl.
CPC .......... *G01S 15/96* (2013.01); *G01S 7/521* (2013.01); *G01S 7/527* (2013.01);
(Continued)

(58) Field of Classification Search
CPC ...... G01S 15/96; G01S 7/52077; G01S 7/521; G01S 7/527; G01S 15/8902; G10K 11/352; G10K 11/008; G10K 11/006
See application file for complete search history.

(56) References Cited

U.S. PATENT DOCUMENTS 2,671,206 A  3/1954  Krause
3,680,105 A  7/1972  Goldstone
(Continued)

FOREIGN PATENT DOCUMENTS

DE  4117849  12/1992
EP  1148347  10/2001
(Continued)

*Primary Examiner* — Daniel Pihulic
(74) *Attorney, Agent, or Firm* — Haynes and Boone, LLP

(57) ABSTRACT

Techniques are disclosed for systems and methods to provide sonar systems for mobile structures. A sonar system includes a sonar transducer assembly including a sonar transducer, a sonar receiver configured to receive acoustic returns from the sonar transducer and convert the acoustic returns into arrays of time differentiated sonar data samples, and a logic device adapted to communicate with the sonar receiver. The logic device is configured to receive the arrays of the time differentiated sonar data samples from the sonar receiver and process the received arrays to enhance the time differentiated sonar data samples substantially without enhancing sonar artifacts in the time differentiated sonar data samples Processed sonar data and/or resulting imagery may be displayed to a user and/or used to adjust a steering actuator, a propulsion system thrust, and/or other operational systems of the sonar transducer assembly and/or a mobile structure.

20 Claims, 11 Drawing Sheets

Related U.S. Application Data continuation-in-part of application No. PCT/US2015/015279, filed on Feb. 10, 2015, said application No. PCT/US2015/067947 is a continuation of application No. PCT/US2015/032311, filed on May 22, 2015, said application No. PCT/US2015/067947 is a continuation-in-part of application No. PCT/US2015/032304, filed on May 22, 2015, application No. 15/638,124, which is a continuation-in-part of application No. 15/239,770, filed on Aug. 17, 2016, now Pat. No. 10,241,200, which is a continuation of application No. PCT/US2015/015279, filed on Feb. 10, 2015, application No. 15/638,124, which is a continuation-in-part of application No. 15/352,462, filed on Nov. 15, 2016, which is a continuation of application No. PCT/US2015/032311, filed on May 22, 2015, application No. 15/638,124, which is a continuation-in-part of application No. 15/353,579, filed on Nov. 16, 2016, now Pat. No. 10,416,307, which is a continuation of application No. PCT/US2015/032304, filed on May 22, 2015, application No. 15/638,124, which is a continuation-in-part of application No. 15/287,652, filed on Oct. 6, 2016, now Pat. No. 10,338,217, which is a continuation of application No. 14/261,316, filed on Apr. 24, 2014, now Pat. No. 9,470,779, which is a continuation of application No. PCT/US2012/062315, filed on Oct. 26, 2012.

(60) Provisional application No. 62/097,546, filed on Dec. 29, 2014, provisional application No. 61/943,170, filed on Feb. 21, 2014, provisional application No. 62/005,819, filed on May 30, 2014, provisional application No. 62/005,838, filed on May 30, 2014, provisional application No. 62/261,793, filed on Dec. 1, 2015, provisional application No. 61/551,875, filed on Oct. 26, 2011, provisional application No. 61/551,890, filed on Oct. 26, 2011, application No. 61/067,435, filed on Mar. 6, 2012.

(51) Int. Cl.

| | | |
|---|---|---|
| *G01S 7/527* | (2006.01) | |
| *G01S 15/02* | (2006.01) | |
| *G01S 15/10* | (2006.01) | |
| *G01S 15/96* | (2006.01) | |
| *G01S 7/521* | (2006.01) | |
| *G10K 11/00* | (2006.01) | |
| *G10K 11/35* | (2006.01) | |
| *G01S 15/89* | (2006.01) | |

(52) U.S. Cl.
CPC ........ *G01S 7/52077* (2013.01); *G10K 11/006* (2013.01); *G10K 11/008* (2013.01); *G10K 11/352* (2013.01); *G01S 15/8902* (2013.01)

(56) References Cited

U.S. PATENT DOCUMENTS

| | | |
|---|---|---|
| 3,931,549 A | 1/1976 | Berns et al. |
| 3,989,216 A | 11/1976 | Veatch |
| 4,626,853 A | 12/1986 | Lee et al. |
| 4,710,772 A | 12/1987 | Cantwell et al. |
| 4,787,847 A | 11/1988 | Martin et al. |
| 4,949,318 A | 8/1990 | Patrick et al. |
| 4,982,924 A | 1/1991 | Havins |
| 5,070,337 A | 12/1991 | Chen et al. |
| 5,142,649 A | 8/1992 | O'Donnell |
| 5,530,680 A | 6/1996 | Whitehurst |
| 5,532,700 A | 7/1996 | Lockwood |
| 5,561,641 A | 10/1996 | Nishimori et al. |
| 5,675,552 A | 10/1997 | Hicks et al. |
| 5,887,376 A | 3/1999 | Currier et al. |
| 6,050,945 A | 4/2000 | Peterson et al. |
| 6,335,905 B1 | 1/2002 | Kabel |
| 6,432,055 B1 | 8/2002 | Carp et al. |
| 6,473,636 B1 | 10/2002 | Wei et al. |
| 6,806,622 B1 | 10/2004 | Schmidt et al. |
| 7,542,376 B1 | 6/2009 | Thompson et al. |
| 2003/0128554 A1 | 7/2003 | Crewson et al. |
| 2004/0109388 A1 | 6/2004 | Sogaard |
| 2004/0158147 A1 | 8/2004 | Shifrin |
| 2004/0254459 A1 | 12/2004 | Kristoffersen et al. |
| 2005/0007879 A1 | 1/2005 | Nishida |
| 2008/0037371 A1 | 2/2008 | Chang et al. |
| 2008/0080316 A1 | 4/2008 | Inouchi et al. |
| 2010/0097891 A1 | 4/2010 | Cummings |
| 2010/0253458 A1 | 10/2010 | Chen et al. |
| 2011/0002191 A1 | 1/2011 | DeMaio et al. |
| 2011/0007606 A1 | 1/2011 | Curtis |
| 2011/0032801 A1 | 2/2011 | Onishi et al. |
| 2011/0184289 A1 | 7/2011 | Oshiki et al. |
| 2012/0014220 A1 | 1/2012 | DePasqua |
| 2014/0010049 A1 | 1/2014 | Proctor |
| 2014/0233355 A1 | 8/2014 | Stokes et al. |
| 2014/0286131 A1 | 9/2014 | Stokes et al. |
| 2015/0294660 A1 | 10/2015 | Stokes et al. |
| 2016/0187474 A1* | 6/2016 | Webb .................... G01S 7/5276 367/98 |
| 2017/0299703 A1* | 10/2017 | Stokes .................... G01S 7/527 |

FOREIGN PATENT DOCUMENTS

| | | | | |
|---|---|---|---|---|
| EP | 2189808 | | 5/2010 | |
| EP | 2626721 | | 8/2013 | |
| GB | 2550716 A | * | 11/2017 | |
| JP | 2005045057 | | 2/2005 | |
| JP | 2012154791 | | 8/2012 | |
| WO | WO 2013/063515 | | 5/2013 | |
| WO | WO 2015/126678 | | 8/2015 | |
| WO | WO-2016109592 A1 | * | 7/2016 | ........... G01S 15/025 |

\* cited by examiner

SONAR DATA ENHANCEMENT SYSTEMS AND METHODS

CROSS-REFERENCE TO RELATED APPLICATIONS

This application is a continuation of International Patent Application No. PCT/US2015/067947 filed Dec. 29, 2015 and entitled "SONAR DATA ENHANCEMENT SYSTEMS AND METHODS", which is hereby incorporated herein by reference in its entirety.

International Patent Application No. PCT/US2015/067947 claims priority to and the benefit of U.S. Provisional Patent Application No. 62/097,546 filed Dec. 29, 2014 and entitled "SONAR DATA ENHANCEMENT SYSTEMS AND METHODS", which is hereby incorporated herein by reference in its entirety.

International Patent Application No. PCT/US2015/067947 is also a continuation-in-part of International Patent Application No. PCT/US2015/015279 filed Feb. 10, 2015 and entitled "MODULAR SONAR TRANSDUCER ASSEMBLY SYSTEMS AND METHODS" which claims priority to and the benefit of U.S. Provisional Patent Application No. 61/943,170 filed Feb. 21, 2014 and entitled "MODULAR SONAR TRANSDUCER ASSEMBLY SYSTEMS AND METHODS", all of which are hereby incorporated herein by reference in their entirety.

International Patent Application No. PCT/US2015/067947 is also a continuation-in-part of International Patent Application No. PCT/US2015/032311 filed May 22, 2015 and entitled "TRANSMISSION SIGNAL SHAPING SYSTEMS AND METHODS" which claims priority to and the benefit of U.S. Provisional Patent Application No. 62/005,819 filed May 30, 2014 and entitled "TRANSMISSION SIGNAL SHAPING SYSTEMS AND METHODS", all of which are hereby incorporated herein by reference in their entirety.

International Patent Application No. PCT /US2015/067947 is also a continuation-in-part of International Patent Application No. PCT/US2015/032304 filed May 22, 2015 and entitled "MULTICHANNEL SONAR SYSTEMS AND METHODS" which claims priority to and the benefit of U.S. Provisional Patent Application No. 62/005,838 filed May 30, 2014 and entitled "MULTICHANNEL SONAR SYSTEMS AND METHODS", all of which are hereby incorporated herein by reference in their entirety.

International Patent Application No. PCT/US2015/067947 also claims priority to and the benefit of U.S. Provisional Patent Application No. 62/261,793 filed Dec. 1, 2015 and entitled "AUTONOMOUS SONAR SYSTEMS AND METHODS", which is hereby incorporated herein by reference in its entirety.

International Patent Application No. PCT/US2015/067947 is related to International Patent Application No. PCT/US2012/062315 filed Oct. 26, 2012 and entitled "WIDEBAND SONAR RECEIVER AND SONAR SIGNAL PROCESSING ALGORITHMS", which claims priority to and the benefit of U.S. Provisional Patent Application No. 61/551,875 filed Oct. 26, 2011 and entitled "WIDEBAND SONAR RECEIVER", U.S. Provisional Patent Application No. 61/551,890 filed Oct. 26, 2011 and entitled "SONAR HIGH LEVEL PROCESSING", and U.S. Provisional Patent Application No. 61/607,435 filed Mar. 6, 2012 and entitled "PULSE COMPRESSION SONAR WITH SHAPING FILTER", all of which are hereby incorporated herein by reference in their entirety.

International Patent Application No. PCT/US2015/067947 is also related to U.S. patent application Ser. No. 14/261,316 filed Apr. 24, 2014 and entitled "WIDEBAND SONAR RECEIVER AND SONAR SIGNAL PROCESSING ALGORITHMS", which is a continuation of International Patent Application No. PCT/US2012/062315 filed Oct. 26, 2012 and entitled "WIDEBAND SONAR RECEIVER AND SONAR SIGNAL PROCESSING ALGORITHMS", which claims priority to and the benefit of U.S. Provisional Patent Application No. 61/551,875 filed Oct. 26, 2011 and entitled "WIDEBAND SONAR RECEIVER", U.S. Provisional Patent Application No. 61/551,890 filed Oct. 26, 2011. and entitled "SONAR HIGH LEVEL PROCESSING", and U.S. Provisional Patent Application No. 61/607,435 filed Mar. 6, 2012 and entitled "PULSE COMPRESSION SONAR WITH SHAPING FILTER", all of which are hereby incorporated herein by reference in their entirety.

This application is also a continuation-in-part of U.S. Patent Application Ser. No. 15/239,770 filed Aug. 17, 2016 and entitled "MODULAR SONAR TRANSDUCER ASSEMBLY SYSTEMS AND METHODS", which is a continuation of International Patent Application No. PCT/US2015/015279 filed Feb. 10, 2015 and entitled "MODULAR SONAR TRANSDUCER ASSEMBLY SYSTEMS AND METHODS" which claims priority to and the benefit of U.S. Provisional Patent Application No. 61/943,170 filed Feb. 21, 2014 and entitled "MODULAR SONAR TRANSDUCER ASSEMBLY SYSTEMS AND METHODS", all of which are hereby incorporated herein by reference in their entirety.

This application is also a continuation-in-part of U.S. patent application Ser. No. 15/352,462 filed Nov. 15, 2016 and entitled "TRANSMISSION SIGNAL SHAPING SYSTEMS AND METHODS", which is a continuation of International Patent Application No. PCT/US2015/032311 filed May 22, 2015 and entitled "TRANSMISSION SIGNAL SHAPING SYSTEMS AND METHODS" which claims priority to and the benefit of U.S. Provisional Patent Application No. 62/005,819 filed May 30, 2014 and entitled "TRANSMISSION SIGNAL SHAPING SYSTEMS AND METHODS", all of which are hereby incorporated herein by reference in their entirety.

This application is also a continuation-in-part of U.S. patent application Ser. No. 15/353,579 filed Nov. 16, 2016 and entitled "MULTICHANNEL SONAR SYSTEMS AND METHODS", which is a continuation of International Patent Application No. PCT/US2015/032304 tiled May 22, 2015 and entitled "MULTICHANNEL SONAR SYSTEMS AND METHODS" which claims priority to and the benefit of U.S. Provisional Patent Application No. 62/005,838 filed May 30, 2014 and entitled "MULTICHANNEL SONAR SYSTEMS AND METHODS", all of which are hereby incorporated herein by reference in their entirety.

This application is also a continuation-in-part of U.S. patent application Ser. No. 15/287,652 filed Oct. 6, 2016 and entitled "WIDEBAND SONAR RECEIVER AND SONAR SIGNAL PROCESSING ALGORITHMS", which is a continuation of U.S. patent application Ser. No. 14/261,316 filed Apr. 24, 2014 and entitled "WIDEBAND SONAR RECEIVER AND SONAR SIGNAL PROCESSING ALGORITHMS" (now U.S. Pat. No. 9,470,779 issued Oct. 18, 2016), which is a continuation of International Patent Application No. PCT/US2012/062315 filed Oct. 26, 2012 and entitled "WIDEBAND SONAR RECEIVER AND SONAR SIGNAL PROCESSING ALGORITHMS", which claims priority to and the benefit of U.S. Provisional Patent Application No. 61/551,875 filed Oct. 26, 2011 and entitled "WIDEBAND SONAR RECEIVER", U.S. Provisional Patent Application No. 61/551,890 filed Oct. 26, 2011 and entitled "SONAR HIGH LEVEL PROCESSING", and U.S. Provisional Patent Application No. 61/607,435 filed Mar. 6, 2012 and entitled "PULSE COMPRESSION SONAR WITH SHAPING FILTER", all of which are hereby incorporated herein by reference in their entirety.

TECHNICAL FIELD

One or more embodiments of the invention relate generally to sonar systems and more particularly, for example, to systems and methods for providing sonar data enhancements.

BACKGROUND

Sonar may be used to perform bathymetry, detect underwater hazards, find fish, and/or otherwise assist in navigation by producing data and/or imagery of a water column beneath a watercraft. However, conventional sonar imagery can be difficult to interpret by inexperienced users due to a number of factors, including the quality of the resulting imagery.

In particular, higher quality sonar imagery has conventionally been associated with relatively large, complex, unwieldy, and expensive sonar systems. At the same time, consumer market pressures and convenience dictate smaller and easier to use systems that include more features and produce higher quality resulting imagery. Thus, there is a need for an improved methodology to provide feature-rich and flexible-use sonar systems, particularly in the context of providing relatively high quality sonar data and/or imagery.

SUMMARY

Techniques are disclosed for systems and methods to provide accurate and compact sonar systems for mobile structures in accordance with one or more embodiments. A sonar system may include one more sonar transducers and associated processing and control electronics, and optionally a wireless communications module, a substantially self-contained power system, and orientation and/or position sensors, all disposed substantially within a housing of a sonar transducer assembly. The sonar transducers may be implemented with one or more single channel transducers and/or with one or more multichannel transducers each with multiple transmission and/or receive channels/transducer elements. The transducer assembly may be configured to support and protect the sonar transducers and associated electronics and sensors and/or to physically and/or adjustably couple to a mobile structure or to a mounting system that is in turn mounted to a mobile structure. The system may additionally include one or more actuators configured to adjust an orientation and/or position of the transducer assembly. Resulting sonar data and/or imagery may be displayed to a user and/or used to adjust various operational systems of the mobile structure.

In various embodiments, a sonar system may include a sonar transducer assembly comprising a sonar transducer; a sonar receiver configured to receive acoustic returns from the sonar transducer and convert the acoustic returns into arrays of time differentiated sonar data samples; and a logic device adapted to communicate with the sonar receiver. The logic device may be configured to receive the arrays of the time differentiated sonar data samples from the sonar receiver; and process the received arrays to enhance the time differentiated sonar data samples substantially without enhancing sonar artifacts in the time differentiated sonar data samples. In some embodiments, the logic device may be configured to provide the enhanced arrays and/or sonar images based on the enhanced arrays to a user interface for display to a user.

In some embodiments, a method may include receiving arrays of time differentiated sonar data samples; processing the received arrays to enhance the time differentiated sonar data samples substantially without enhancing sonar artifacts in the time differentiated sonar data samples; and generating one or more sonar images based, at least in part, on the arrays of the enhanced time differentiated sonar data samples. In some embodiments, the method may include providing the one or more sonar images to a user interface for display.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, sonar systems and methods may produce sonar data and/or imagery that has increased definition and/or quality and is easier to interpret than conventional sonar data and/or imagery provided by conventional systems and/or methods by, for example, processing sonar data samples directly (e.g., at the full resolution of the sonar system) to enhance the sonar data samples before converting them to sonar images and before losing any information in the image conversion process. Furthermore, such processing may be performed substantially without also enhancing sonar artifacts in the sonar data samples, which would otherwise help to obscure detail and features in the actual sonar returns included in the sonar data samples.

One or more embodiments of the described sonar systems may advantageously include a controller and one or more sonar transducer assemblies in conjunction with an orientation sensor, a gyroscope, an accelerometer, a position sensor, and/or a speed sensor providing measurements of an orientation, position, acceleration, and/or speed of the sonar transducer assemblies and/or a coupled mobile structure. For example, the sensors may be mounted to or within the mobile structure (e.g., a watercraft, aircraft, motor vehicle, and/or other mobile structure), or may be integrated with the sonar transducer assemblies and/or the controller. Various embodiments of the present disclosure may be configured to automatically coordinate sonar operation with various orientation and/or position measurements to produce relatively high quality enhanced sonar data and/or imagery.

Sonar data and/or imagery generated by a sonar transducer assembly may be transmitted to a user interface for display to a user. The user interface may in some embodiments be implemented as one or more dedicated displays, for example, such as a multi-function display (MFD). In other embodiments, the user interface may be implemented as a portable electronic device, for example, such as a tablet, laptop, smart phone, or other portable electronic device. In various embodiments, the sonar transducer assembly may be configured to communicate with user interfaces and/or other sonar transducer assemblies over a network, such as a wireless and/or wired network.

Figure 1A:
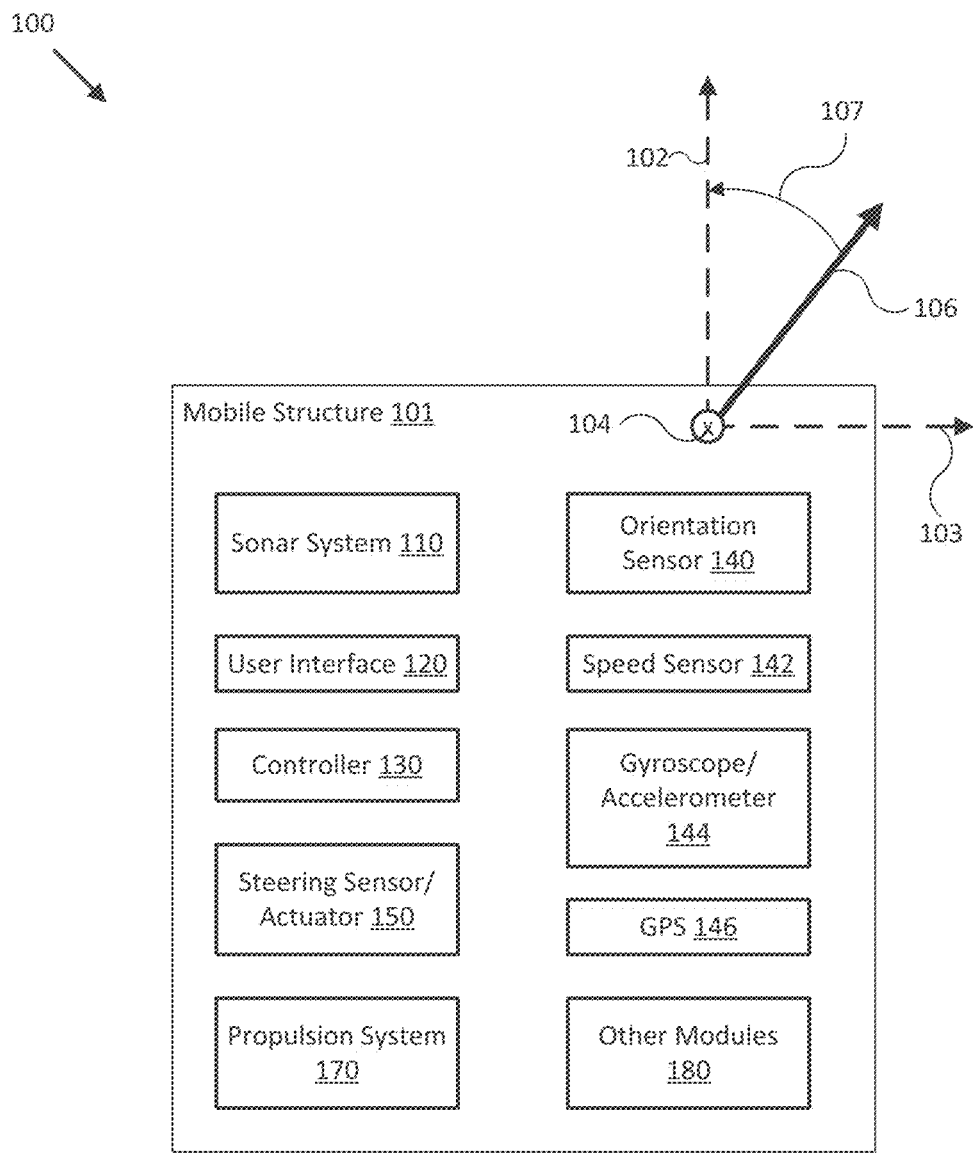
FIG. 1A illustrates a block diagram of a mobile structure including a sonar system in accordance with an embodiment of the disclosure.

As an example, FIG. 1A illustrates a block diagram of system 100 in accordance with an embodiment of the disclosure. In various embodiments, system 100 may be adapted to provide sonar data from an environment about mobile structure 101 and/or sonar system 110. In some embodiments, system 100 may be adapted to measure an orientation, a position, an acceleration, and a speed of mobile structure 101 and/or sonar system 110. System 100 may then use these measurements to form various views of sonar data provided by sonar system 110 and/or to adjust an orientation of sonar system 110 according to a desired operation of sonar system 110 and/or mobile structure 101. in some embodiments, system 100 may display resulting sonar data and/or imagery to a user through user interface 120, and/or use the sonar data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sonar data and/or imagery for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global positioning satellite system (GPS) 146, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101, towed behind mobile structure 101, separately piloted/autopiloted near mobile structure 101, and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope/accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation).

In some embodiments, directional measurements may initially be referenced to a coordinate frame of a particular sensor (e.g., a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Sonar system 110 may be implemented with one or more electrically and/or mechanically coupled controllers, transmitters, receivers, transceivers, signal processing logic devices, autonomous power systems, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. Sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

For example, in various embodiments, sonar system 110 may be implemented and/or operated according to any one or combination of the systems and methods described in U.S. Provisional Patent Application 62/005,838 filed May 30, 2014 and entitled "MULTICHANNEL SONAR SYSTEMS AND METHODS", U.S. Provisional Patent Application 61/943,170 filed Feb. 21, 2014 and entitled "MODU- LAR SONAR TRANSDUCER ASSEMBLY SYSTEMS AND METHODS", and/or U.S. Provisional Patent Application 62/087,189 filed Dec. 3, 2014 and entitled "AUTONOMOUS SONAR SYSTEMS AND METHODS", each of which are hereby incorporated by reference in their entirety. In other embodiments, sonar system 110 may be implemented according to other sonar system arrangements that can be used to detect objects within a water column and/or a floor of a body of water.

In some embodiments, sonar system 110 may be implemented using a compact design, where multiple sonar transducers, sensors, and/or associated processing devices are located within a single transducer assembly housing that is configured to interface with the rest of system 100 through one or more wired and/or wireless communication protocols. In some embodiments, sonar system 110 may include orientation and/or position sensors configured to help provide two or three dimensional waypoints, increase sonar data and/or imagery quality, and/or provide highly accurate bathymetry data, as described herein.

For example, in the context of sea based sonar, fisherman desire highly detailed and accurate information and/or imagery of underwater structure and mid water targets (e.g., fish). Embodiments of sonar system 110 provide a sonar system that can be configured to produce detailed two and three dimensional sonar data and/or imagery. In some embodiments, sonar system 110 may be implemented with a sonar transducer assembly incorporating its own steering and propulsion system to provide roaming sonar imagery while mobile structure is relatively stationary.

In various embodiments, sonar system 110 may be configured to provide many different display views from a variety of selectable perspectives, including down imaging, side imaging, and/or three dimensional imaging, potentially using the same hardware but with different selectable configurations and/or processing methods, as described herein. In some embodiments, sonar system 110 may be implemented with a single transducer assembly housing/incorporating a single channel and/or multichannel transducer and associated electronics. Such embodiments can reduce overall system cost, for example, by reducing or eliminating a need for installation of shielded interface cabling. Such embodiments may also provide improved image quality by locating transmission and receiver electronics close to their corresponding transmission and receive transducer channels, which can dramatically improve signal to noise relative to systems that transmit and/or receive analog signals over long cabling.

In general, embodiments of sonar system 110 may be configured to transmit shaped acoustic beams using a single transmission channel/transducer and/or a single element of a multichannel transducer, receive similarly shaped acoustic returns using corresponding receive channels and/or elements, and to perform various processing operations (e.g., spatial correlation, beamforming, interferometry, and/or other signal processing) on the acoustic returns to produce high quality and/or enhanced two and/or three dimensional sonar data and/or imagery, as described herein. In some embodiments, one or more sonar transmitters of sonar system 110 may be configured to use chirp signals to improve range resolution and/or reduce ambiguities typically inherent in interferometry processing techniques.

In various embodiments, sonar system 110 may be configured to receive the acoustic returns, convert (e.g., using an analog to digital converter) each acoustic return to a time series array of time differentiated sonar data samples, and process (e.g., using one or more logic devices) the resulting arrays of time differentiated sonar data samples to enhance the sonar data. samples, such as providing increased contrast in the sonar data samples through edge detection and enhancement, as described more fully herein. In related embodiments, such enhancement may be performed substantially without enhancing sonar artifacts (e.g., noise, surface clutter, interference, and/or other sonar artifacts) in the sonar data samples. For example, detection and/or filtering of sonar artifacts may remove or mitigate such artifacts before or after processing the sonar data samples for enhancement. The resulting arrays of enhanced sonar data samples may be used, along with other sensor data, to generate sonar imagery that includes the benefit of the sonar data sample enhancement at substantially all display resolutions.

In some embodiments, sonar system 110 may be implemented with optional orientation and/or position sensors (e.g., similar to orientation sensor 140, gyroscope/accelerometer 144, and/or GPS 146) that may be incorporated within the transducer assembly housing to provide three dimensional orientations and/or positions of the transducer assembly and/or multichannel transducer for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. For instance, in some embodiments, the sonar data samples in two or more arrays of sonar data samples may be spatially and temporally aligned to each other based on their position in their respective arrays and the positions and/or orientations of the corresponding sonar transducer and/or assembly during the respective ensonifications. In other embodiments, an external orientation and/or position sensor can be used alone or in combination with an integrated sensor or sensors.

In embodiments where sonar system 110 is implemented with a position sensor, sonar system 110 may be configured to provide a variety of additional sonar data and/or imagery enhancements. For example, sonar system 110 may be configured to provide accurate positioning of waypoints (e.g., selected according to relative position to a feature in sonar imagery) remote from mobile system 101 without having to estimate positions using, for example, water depth and range. Similarly, sonar system 110 may be configured to provide accurate two and/or three dimensional display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GPS 146), sonar system 110 may be configured to generate accurate and detailed bathymetric views of a water bed or floor.

In embodiments where sonar system 110 is implemented with an orientation and/or position sensor, sonar system 110 may be configured to store such location/position information along with other sensor information (acoustic returns/sonar data samples, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate operation with some other sensor information. Alternatively, an automated adjustment algorithm can be used to select optimum configurations based on the sensor information.

For example, in one embodiment, mobile structure 101. may be located in an area identified on an chart using position data, a user may have selected a user setting for a configuration of sonar system 110, and controller 130 may be configured to control an actuator and/or otherwise implement the configuration for sonar system 110 (e.g., to set a particular orientation). In another embodiment, controller 130 may be configured to determine water depth and/or altitude, and use such data to control an orientation of sonar system 110 to maintain an optimum orientation (e.g., depression angle) for the reported depths/altitudes. In yet another embodiment, a user may be searching for fish in a wide area and may select a configuration setting (e.g., transmission frequency, depression angle, sweep angle) that will adjust a transducer assembly configuration to ensonify a relatively broad, shallow area.

In still another embodiment, controller 130 may be configured to receive orientation measurements for mobile structure 101. In such embodiment, controller 130 may be configured to control the actuators associated with the transducer assembly to maintain its orientation relative to, for example, the water surface and/or gravitational down direction, and thus improve the displayed sonar images (e.g., by ensuring consistently oriented acoustic beams and/or proper registration of a series of acoustic returns). In various embodiments where sonar system 110 is coupled to mobile structure 101, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, which may also be integrated with sonar system 110.

User interface 120 may be implemented as one or more of a display, a touch screen, a keyboard, a mouse, a joystick, a knob, a steering wheel, a ship's wheel or helm, a yoke, and/or any other device capable of accepting user input and/or providing feedback to a user. For example, in some embodiments, user interface 120 may be implemented and/or operated according to any one or combination of the systems and methods described in U.S. Provisional Patent Application 62/069,961 fled Oct. 29, 2014 and entitled "PILOT DISPLAY SYSTEMS AND METHODS", which is hereby incorporated by reference in its entirety.

In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods described herein.

In some embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101 and/or sonar system 110. In such embodiment, user interface 120 may be adapted to process the sensor signals to determine sensor information indicating an estimated and/or absolute roll, pitch, and/or yaw (attitude and/or rate), and/or a position or series of positions of mobile structure 101 or sonar system 110, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101 and/or sonar system 110. For example, user interface 120 may be adapted to display a time series of positions, headings, and/or orientations of mobile structure 101 and/or other elements of system 100 (e.g., a transducer assembly and/or module of sonar system 110) overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, route, and/or orientation for a transducer module, for example, and to generate control signals for steeling sensor/actuator 150 and/or propulsion system 170 to cause mobile structure 101 to move according to the target heading, route, and/or orientation. In further embodiments, user interface 120 may be adapted to accept user input including a user-defined target attitude, orientation, and/or position for an actuated device (e.g., sonar system 110) associated with mobile structure 101, for example, and to generate control signals for adjusting an orientation and/or position of the actuated device according to the target attitude, orientation, and/or position. More generally, user interface 120 may be adapted to display sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, mobile structure 101, and/or system 100.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a. time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GPS 146 may be implemented as a global positioning satellite receiver and/or other device capable of determining absolute and/or relative position of mobile structure 101 based on wireless signals received from space-born and/or terrestrial sources, for example, and capable of providing such measurements as sensor signals that may be communicated to various devices of system 100. In some embodiments, GPS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or a stabilized attitude estimates provided by logic device of system 100, such as controller 130. Steering sensor/actuator 150 may include one or more actuators and control surfaces (e.g., a rudder or other type of steering mechanism) of mobile structure 101, and may be adapted to sense and/or physically adjust the control surfaces to a variety of positive and/or negative steering angles positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, visible and/or IR cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein. For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144 and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cell modules or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame and/or other desired position and/or orientation. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
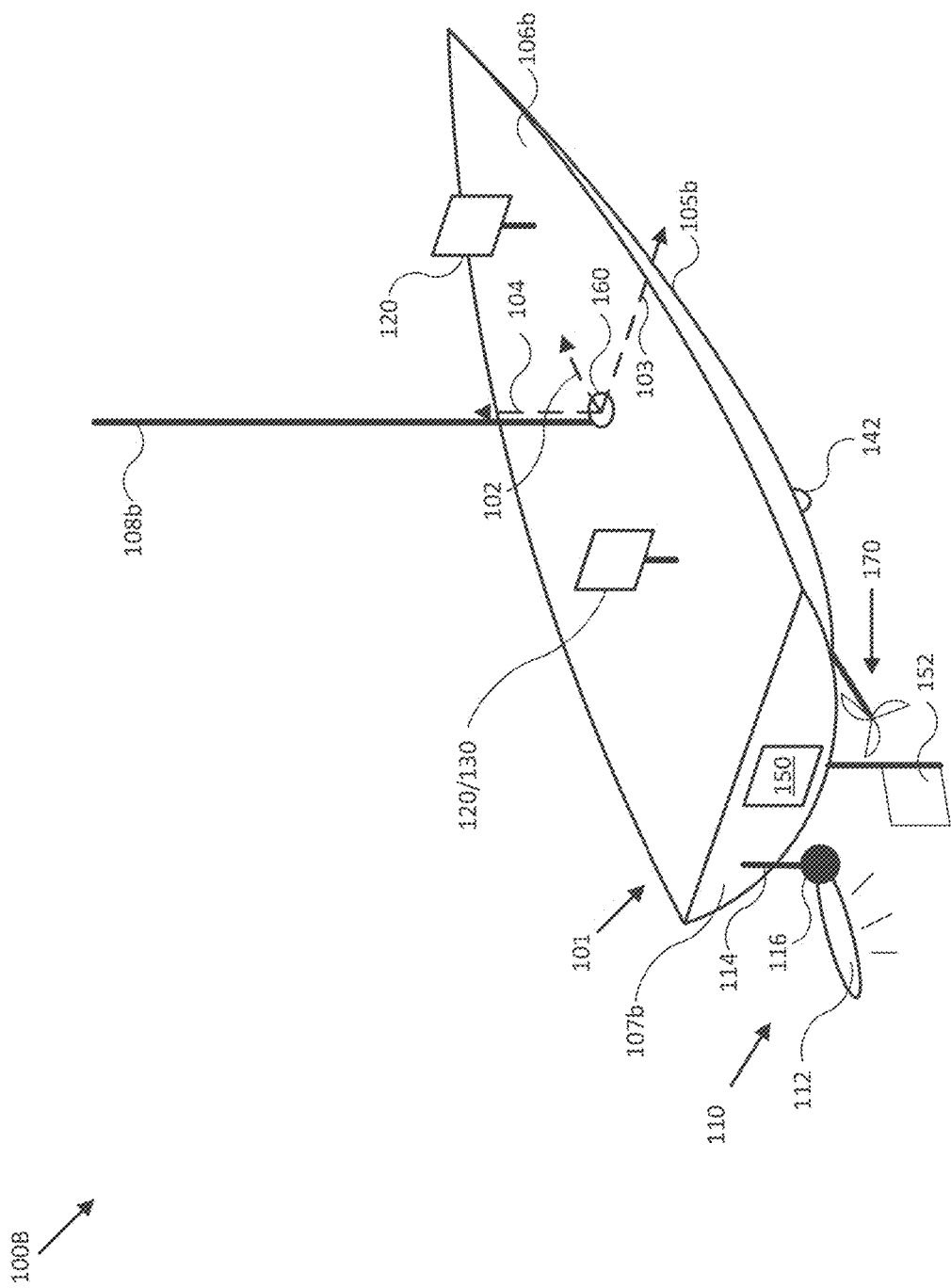
FIG. 1B illustrates a diagram of a watercraft including a sonar system in accordance with an embodiment of the disclosure.

FIG. 1B illustrates a diagram of system 100B in accordance with an embodiment of the disclosure. In the embodiment shown in FIG. 1B, system 100B may be implemented to provide sonar data and/or imagery for use with operation of mobile structure 101, similar to system 100 of FIG. 1B. For example, system 100B may include sonar system 110, integrated user interface/controller 120/130, secondary user interface 120, steering sensor/actuator 150, sensor cluster 160 (e.g., orientation sensor 140, gyroscope/accelerometer 144, and/or GPS 146), and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/ controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein.

In another embodiment, user interface/controller 120/130 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. In some embodiments, sonar system 110 may include no actuators and sonar transducer assembly 112 may be mounted directly to transom 107b using a conventional transom bracket. In other embodiments, sonar system 110 may include its own steering and/or propulsion system (e.g., similar to steering sensor/actuator 150, rudder 152, and/or propulsion system 170 of mobile structure 101) and be remotely controlled in an area relatively local to mobile structure 101, using user interfaces 120 for example, when detached from mobile structure 101.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 106b) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142. may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cell modules or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2:
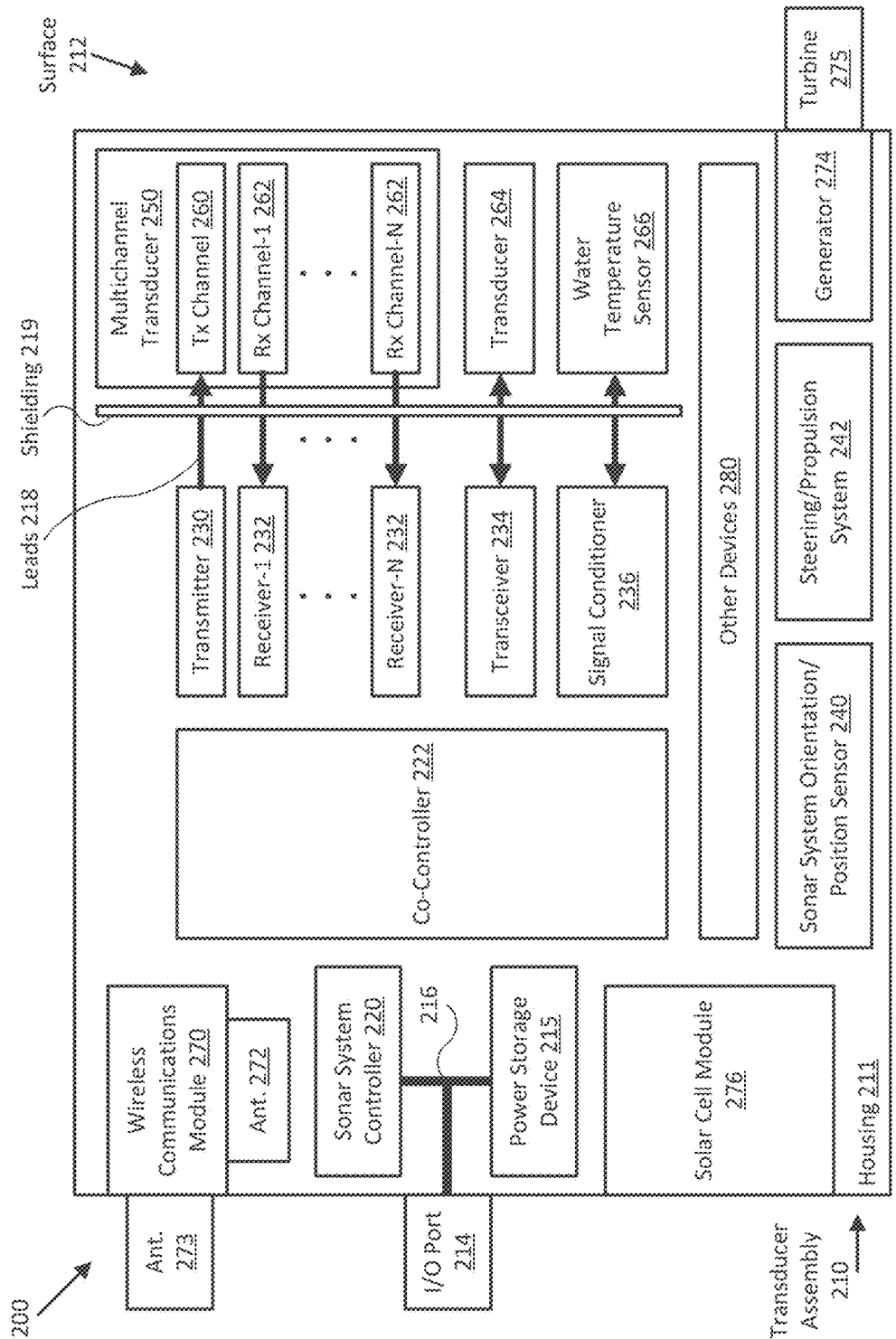
FIG. 2 illustrates a diagram of a sonar transducer assembly for a sonar system in accordance with an embodiment of the disclosure.

FIG. 2 illustrates a diagram of a sonar system 200 in accordance with an embodiment of the disclosure. In the embodiment shown in FIG. 2, sonar system 200 includes a transducer assembly 210 that can be configured to communicate to a user interface (e.g., user interface 120 of FIG. 1A) using a wired connection/interface (e.g., I/O port 214 and leads 216) and/or a wireless communications module and/or one or more internal and/or external antennas (e.g., wireless communications module 270 and/or internal and/or external antennas 272/273). As shown, transducer assembly 210 may include one or more controllers (e.g., sonar system controller 220 and/or co-controller 22.2), transducers (e.g., multichannel transducer 250 and/or transducer 264), other sensors (e.g., orientation/position sensor 240 and/or water temperature sensor 266), and/or other devices (e.g., power storage device 215, generator 274, turbine 275, and/or solar cell module 276—collectively a power system for transducer assembly 210) facilitating operation of system 200 all disposed within or coupled to a common housing 211. In some embodiments, one or more of the devices shown in FIG. 2 may be integrated with a remote user interface and communicate with remaining devices within transducer assembly 210 through one or more wired and/or wireless communication links.

Controller 220 and/or co-controller 222 may each be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transducer assembly 210 and/or system 200, for example, similar to controller 130. In typical embodiments, controller 220 may be tasked with overseeing general operation of transducer assembly 210, generating sonar imagery from sonar data, correlating sensor data with sonar data/imagery, communicating operational parameters and/or sensor information with other devices through wireless communication links supported by wireless communications module 270, and/or other non-time-critical operations of system 200. In such embodiments, co-controller 222 may be implemented with relatively high resolution timing circuitry capable of generating digital transmission and/or sampling control signals for operating transmitters, receivers, transceivers, signal conditioners, and/or other devices of transducer assembly 210, for example, and other time critical operations of system 200, such as per-sample digital enhancement, beamforming, and/or interferometry operations applied to sonar returns from multichannel transducer 250 and/or transducer 264, as described herein. In some embodiments, controller 220 and co-controller 222 may be integrated together, for example, or may be implemented in a distributed manner across a number of individual controllers/logic devices.

Transmitter 230 may be implemented with one or more digital to analog converters (DACs), signal shaping circuits, filters, phase adjusters, signal conditioning elements, amplifiers, timing circuitry, logic devices, and/or other digital and/or analog electronics configured to accept digital control signals from co-controller 222 and to generate transmission signals to excite a transmission channel/transducer element of multichannel transducer 250 (e.g., transmission channel 260) to produce one or more acoustic beams. In some embodiments, operation of transmitter 230 (e.g., amplification, frequency dependent filtering, transmit signal frequency, duration, shape, and/or timing/triggering, and/or other signal attributes), may be controlled (e.g., through use of various control signals) by co-controller 222, as described herein.

For example, in various embodiments, transmitter 230 may be implemented and/or operated according to any one or combination of the systems and methods described in U.S. Provisional Patent Application 62/005,819 filed May 30, 2014 and entitled "TRANSMISSION SIGNAL SHAPING SYSTEMS AND METHODS", which is hereby incorporated by reference in its entirety. In such embodiments, it can be advantageous to be able to control the overall shape of a transmission signal (e.g., a burst of signals). From a processing perspective, shaping the transmission signal can reduce the number and magnitude of artifacts that typically occur along the range direction of a sonar system, which improves the quality and accuracy of resulting imagery and collateral processing, such as reducing false target detection. From a power amplifier design perspective, the shaping can reduce transients and associated issues with component saturation. From an electromagnetic compatibility (EMC) perspective, the shaping can reduce harmonics and associated spurious interference.

Each of receivers 232 (e.g., for N channels as shown) may be implemented with one or more analog to digital converters (ADCs), filters, phase adjusters, signal conditioning elements, amplifiers, timing circuitry, logic devices, and/or other digital and/or analog electronics configured to accept analog acoustic returns from a corresponding receive channel/transducer element of multichannel transducer 250 (e.g., receive channels 262), convert the analog acoustic returns into digital acoustic returns (e.g., arrays of time differentiated sonar data samples), and provide the digital acoustic returns/arrays of time differentiated sonar data samples to co-controller 222.

In some embodiments, operation of each receiver 232 (e.g., amplification, frequency dependent filtering, basebanding, sample resolution, duration, and/or timing/triggering, and/or other ADC/signal attributes) may be selected and/or controlled by co-controller 222. For example, co-controller 222 may be configured to use receivers 232 to convert an acoustic return into a digital acoustic return/array of time differentiated sonar data samples comprising one or more digital baseband transmissions that are then provided to co-controller 222. In some embodiments, receivers 232. may be configured to low-pass or otherwise filter, amplify, decimate, and/or otherwise process the acoustic and/or digital acoustic returns (e.g., using analog and/or digital signal processing) prior to providing the digital acoustic returns to co-controller 222. In other embodiments, receivers 232 may be configured to provide substantially unprocessed (e.g., raw) analog and/or digital acoustic returns to co-controller 222 for further signal processing, as described herein. In further embodiments, transmitter 230 and one or more of receivers 232 may be integrated into a single transceiver.

In the embodiment shown in FIG. 2, multichannel transducer 250 includes multiple transducer elements and/or transmission/receive channels that may be operated substantially independently of each other and be configured to emit acoustic beams and receive acoustic returns through emission surface 212 of housing 211. In some embodiments, multichannel transducer 250 may include a single transmission channel 260 and, separately, multiple receive channels 262. In other embodiments, multichannel transducer 250 may include multiple transmission channels. In further embodiments, transmission channel 260 may be implemented as both a transmission channel and a receive channel though use of a transceiver (e.g., similar to transceiver 234). In general, transmission channel 260 may be implemented as one, two, or many separate transducer elements configured to produce one or more acoustic beams. Each of receive channels 262 may also be implemented as one, two, or many separate transducer elements, but configured to receive acoustic returns. The effective volumetric shapes of the acoustic beams and acoustic returns may be determined by the shapes and arrangements of their corresponding transducer elements, as described herein. In various embodiments, the various channels of multichannel transducer 250 may be arranged to facilitate multichannel processing, such as beamforming, interferometry, inter-beam interpolation, and/or other types of multichannel processing used to produce sonar data and/or imagery.

For example, in one embodiment, multichannel transducer 250 may be implemented with multiple transmission channels 260 arranged in a phased array to allow electronic steering of relatively narrow acoustic beams (e.g., relative to those produced by a single transmission channel 260) within a relatively wide range of transmission angles. In such embodiments, transducer assembly 210 may be configured to use such electronically steered beams to improve signal-to-noise in resulting sonar data and/or imagery and/or to improve rejection of false targets detected in the corresponding acoustic returns. A related and less complex embodiment could be a transmission array implemented without phasing such that the resulting acoustic beam width can be adjusted by including or excluding transmission channels and/or elements. For example, such embodiments could be used to alternate between operation with deep verses shallow water where the acoustic beams could be switched between relatively narrow for deep water and relative wide for shallow water.

In some embodiments, transducer assembly 210 may be implemented (alternatively, or additionally) with one or more single channel transducers (e.g., transducer 264) serviced by transmitter/receiver electronics similar to transmitter 230 and/or receivers 232 (e.g., transceiver 234, which may include high voltage protection circuitry and/or transmit/receive switching to enable transmission and reception over the same leads 218). In various embodiments, operation of transceiver 234 and/or transducer 264 (e.g., and its constituent transducer elements) may be controlled by co-controller 222, similar to control of transmitter 230 and/or receivers 232 described herein.

In embodiments including multiple transducers, transceiver 234 and/or transducer 264 may be configured to produce acoustic beams adapted to reduce or eliminate interference with operation of another transducer (e.g., multichannel transducer 250), such as by using a substantially different transmission frequency, timing, and/or shape, and/or by aiming the acoustic beams in a substantially non-interfering direction. In alternative embodiments, transceiver 234 and/or transducer 264 may be configured to generate acoustic beams that produce acoustic returns in another transducer (e.g., multichannel transducer 250), similar to operation of transmitter 230 and transmission channel 260, but from an oblique angle relative to the other transducer (e.g., multichannel transducer 250). In such embodiments, the oblique acoustic returns may be used to generate sonar imagery with increased spatial differentiation and/or contrast between objects in the water column ensonified by transducer assembly 210. In some embodiments, one transducer within a transducer assembly may similarly be used in conjunction with other transducers in one or more other transducer assemblies distributed about mobile structure 101.

Transducer assembly 210 may include water temperature sensor 266, which may be a digital and/or analog thermometer, sound cell, and/or other analog or digital device configured to measure a temperature of water near emission surface 212 and provide a corresponding sensor signal to signal conditioner 236 and/or co-controller 222. For example, sound velocity and/or attenuation in water is at least partially dependent on water temperature, and so measured water temperatures may be used to determine accurate measurements of spatial displacements (e.g., depths, object dimensions, and/or other spatial displacements) ensonified by transducer assembly 210. Signal conditioner 236 may be one or more ADCs, filters, signal conditioning elements, amplifiers, timing circuitry, logic devices, and/or other digital and/or analog electronics configured to accept sensor signals from water temperature sensor 266, filter, amplify, linearize, and/or otherwise condition the sensor signals, and provide the conditioned sensor signals to co-controller 222. In some embodiments, signal conditioner 236 may be configured to provide reference signals and/or other control signals to water temperature sensor 266 to enable operation of a particular type of water temperature sensor, for example, and may be controlled by co-controller 222. Embodiments of signal conditioner 236 may also be implemented with other sensors and/or modules of transducer assembly 210.

In FIG. 2, each of multichannel transducer 250, transducer 262, and/or water temperature sensor 266 are coupled to their electronics over leads 218 and through shielding 219. In various embodiments, leads 218 and/or shielding 219 may be implemented as one or more shielded transmission lines configured to convey analog and/or digital signals between the various elements while shielding the transducers and/or temperature sensor from electromagnetic interference from each other, other elements of transducer assembly 210, and/or external sources. In some embodiments, leads 218 and shielding 219 may be integrated together to form a transmission system. For example, shielding 219 may be configured to provide a ground plane/return for signals conveyed by leads 218. In one embodiment, leads 218 may be implemented as a first conductive ribbon with multiple electrically isolated conductive traces (e.g., one for each channel/sensor), for example, and shielding 219 may be implemented as a second conductive ribbon with one or more relatively wide conductive traces electrically coupled to multiple channels of multichannel transducer 250, transducer 264, and/or water temperature sensor 266.

As shown in FIG. 2, transducer assembly 210 may be implemented with sonar system orientation/position sensor 240. Orientation/position sensor 240 may be implemented as one or more orientation sensors, GPS sensors, differential GPS sensors, orientation/position reference transducers and/or optical sensors (e.g., for actuators and/or other sensors configured to measure a relative and/or absolute orientation and/or position of transducer assembly 210, multichannel transducer 250, and/or transducer 264 and provide such measurements to controller 220 and/or co-controller 222. In some embodiments, controller 220 and/or co-controller 222 may be configured to combine sonar data and/or imagery according to such measurements and/or measurements of an orientation and/or position of a coupled mobile structure to produce combined sonar data and/or imagery, such as multiple temporally and spatially aligned arrays of sonar data samples, for example, or co-registered and/or three dimensional sonar images.

In other embodiments, controller 220 and/or co-controller 222 may be configured to use orientation and/or position measurements of transducer assembly 210 and/or a coupled mobile structure to control one or more actuators (e.g., other devices 280) to adjust a position and/or orientation of transducer assembly 210, multichannel transducer 250, and/or transducer 264 and ensonify a particular position and/or orientation beneath transducer assembly 210. As described herein, such orientation and/or position measurements may be stored with or otherwise correlated with sonar data and/or imagery.

In various embodiments, transducer assembly 210 may be implemented with a single housing 211 and/or with a single interface (e.g., I/O port 214) to simplify installation and use. For example, I/O port 214 may be implemented as a power-over-Ethernet (POE) cable interface supporting transmission of both communications and power between transducer assembly 210 and elements of a coupled mobile structure. Such communications and/or power may be delivered over leads 216 to power storage device 215 and/or controller 220. In some embodiments, I/O port 214 may be used to charge power storage device 215 before use, for example, to upload firmware, operating parameters, and/or other data, and/or to download stored data, such as when wireless communications module 270 is absent or inoperable and/or a wireless link to user interface 120 and/or controller 130 is not available. In other embodiments, I/O port 214 may be used to electrically couple an external power system (e.g., an externally mounted solar cell module, battery, turbine/generator, and/or other power generating or storage device) to components within housing 211 of transducer assembly 210.

Optional power storage device 215 may be implemented as one or more batteries, capacitors, power conditioners, line filters, switching power supplies, DC to DC converters, voltage regulators, and/or other power storage devices configured to receive power from I/O port 214 (e.g., over leads 216) and/or from generator 274 and/or solar cell module 276 and distribute power to the various other elements of transducer assembly 210. In some embodiments, power storage device 215 may be mounted within or onto housing 211 to help orient transducer assembly 211 relative to a surface of a body of water, for example, such as being mounted to housing 211 to orient surface 212 substantially down and submerge turbine 275 and/or either of transducers 250 and 264, or to help ensure solar cell module 276 is oriented substantially upward and/or positioned above the surface of the body of water.

Optional generator 274 and turbine 275 may be implemented as one or more mechanical power generating devices or modules configured to engage with a surrounding medium(e.g., water or air) and convert flow of that medium around transducer assembly 210 into electrical power that can be captured and/or stored in power storage device 215 and/or provided to various components within transducer assembly 210. In one embodiment, turbine 275 may be implemented as waterwheel, propeller, a weed shedding shaped turbine, and/or other turbine configured to convert flow of water around transducer assembly 210 into substantially rotational motion, which in turn may be converted into electrical power by generator 274. In another embodiment, turbine 275 may alternatively be configured with generator 274 to convert flow of air around transducer assembly 210 into electrical power. in various embodiments, generator 274 and turbine 275 may be mechanically coupled to each other (e.g., using a shaft protruding through housing 211 and sealed from the environment using one or more shaft seals) to transfer the motion of turbine 275 to generator 274 to generate power. In some embodiments, turbine 275 may be inductively coupled to generator 274 to eliminate a need for a shaft seal and/or hole through housing 211 of sonar transducer assembly 210. Collectively, in some embodiments, power storage device 215, generator 274, turbine 275, and/or solar cell module 276 (e.g., a power system for transducer module 210) may be configured to generate, store, and/or provide power solely for use by transducer assembly 210.

As shown in FIG. 2, transducer assembly 210 may in some embodiments be implemented with an optional steering/propulsion system 242 (e.g., similar to steering sensor/actuator 150 and/or propulsion system 170 of FIGS. 1A and 1B), which may be configured to orient and/or position transducer assembly 210 separate from assembly bracket/actuator 116 and/or mobile structure 101, such as if transducer assembly 210 is configured to be operated as a remote controlled and/or self-controlled autonomous sonar system, or if transducer assembly is configured to be towed behind mobile structure 101. In some embodiments, at least a portion of steering/propulsion system 242 may be implemented with generator 274 and/or turbine 275, for example, where those elements may be selectively configured for power generation or propulsion.

Optional wireless communications module 270 may be implemented as one or more amplifiers, modulators, phase adjusters, beamforming components, digital to analog converters (DACs), analog to digital converters (ADCs), various interfaces, and/or other analog and/or digital components configured to transmit and/or receive signals, for example, in order to facilitate wireless communications between controller 220 and user interface 120 of FIGS. 1A and/or 1B, using any of the wireless communication techniques and/or protocols described herein and/or other wireless communication techniques and/or protocols. As shown in FIG. 2, wireless communications module 270 may be implemented with and/or coupled to internal antenna 272 and/or external antenna 273 to facilitate wireless transmissions according to a particular radiation pattern and/or polarization.

In various embodiments, wireless communications module 270, antennas 272. and/or 273, and/or user interface 120 may be implemented using techniques described in International Application PCT/US14/13439 filed Jan. 28, 2014 and entitled POLARIZATION ALIGNMENT FOR WIRELESS NETWORKING SYSTEMS", which is hereby incorporated by reference herein. For example, in one embodiment, wireless communications module 270, antennas 272 and/or 273, and/or user interface 120 may be configured to transmit and/or receive wireless transmissions with substantially the same polarization alignment to help ensure reliable and low power wireless communications, as described herein. In some embodiments, external antenna 273 may be adjustably mounted to housing 211 to allow adjustment of a radiation pattern and/or polarization of corresponding wireless transmissions relative an orientation to housing 211. In other embodiments, internal antenna 272 may be configured to provide a fixed radiation pattern and/or polarization of wireless transmissions relative to an orientation of housing 211. In some embodiments, multiple antennas providing multiple polarized wireless transmissions may be incorporated into transducer assembly 210 to help provide reliable wireless communications regardless of an orientation of housing 211. Typically, a lateral or horizontal polarization may be preferred in embodiments where transducer assembly 210 is affixed to mobile structure 101, whereas a vertical polarization may be preferred in embodiments where transducer assembly 210 is detached from mobile structure 101 and/or configured to move about under its own motive system.

Other devices 280 may include other and/or additional sensors, sensor arrays, actuators, logic devices, communications modules/nodes, power distribution components, and/or user interface devices used to provide additional environmental information and/or configuration parameters, for example, and/or to adjust a position and/or orientation of transducer assembly 210. In some embodiments, other devices 280 may include a visible spectrum camera, an infrared camera, and/or other environmental sensors providing measurements and/or other sensor signals that can be displayed to a user (e.g., using user interface 120) and/or used by other devices of transducer assembly 210 (e.g., controller 220) to provide operational control of transducer assembly 210. In some embodiments, other devices 280 may include one or more actuators adapted to adjust an orientation (e.g., roll, pitch, and/or yaw) and/or a position (longitudinal, lateral, and/or vertical) of transducer assembly 210, multichannel transducer 250, and/or transducer 264, relative to a coupled mobile structure, in response to one or more control signals (e.g., provided by controller 220).

In other embodiments, other devices 280 may include one or more brackets, such as a transom bracket, adapted to couple housing 211 to mobile structure 101. In a particular embodiment, other devices 280 may include a quick release bracket and/or other type of retention mechanism configured to allow transducer assembly 210 to be attached and removed from mobile structure 101 without the use of a tool (e.g., using a latch mechanism or other hand actuated retention mechanism). For example, in some embodiments, other devices 280 may include a Velcro or suction based mounting and/or retention system, or a moulded cradle or dovetail mounting bracket (e.g., with or without a short safety line). Relatively flexible and/or soft retention systems may be configured to allow transducer assembly 210 to move or swing in response to a bottom strike to reduce risk of damage to mobile structure 101. In various embodiments, transducer assembly 210 may be moved from one mobile structure to another and/or detached from a mobile structure (e.g., for remote controlled and/or self-controlled/autopiloted use), during operation of the mobile structure or structures.

Other embodiments of transducer assembly 210 may include only one or a subset of the elements shown in FIG. 2, such as housing 111 and transducer 264 for example, where other elements are optionally omitted or integrated with one or more external devices (e.g., user interface/controller 120/130) and/or coupled to transducer assembly 210 through I/O port 214.

As noted herein, a sonar user will typically prefer to have sharper sonar images to allow better identification of bottom features and mid water targets and to generally make the sonar images easier to interpret. Embodiments of the sonar systems described herein apply enhancement processing to sonar data samples such that sonar images assembled from the sonar data samples are sharper and/or have better definition. An advantage of applying such processing to sonar data samples, as opposed to sonar image data, is that the resolution, dynamic range, and/or other attributes of the resultant enhanced sonar data samples can be much higher than that provided by sonar imagery and/or pixels of a conventional sonar system display. Furthermore, in some embodiments, such processing can be applied without incurring additional processing load on a display processor (e.g., a logic device configured to convert sonar data samples to sonar images and/or provide the sonar images to a user on a display).

Embodiments disclosed herein also differ from conventional techniques in that they apply enhancement algorithms to the sonar data samples directly before conversion and/or assembly into sonar images. In some embodiments, the methodology also performs a number of additional processes and logical decisions to mitigate enhancement of unwanted sonar artifacts in the sonar data samples, such as noise and surface clutter. As such, embodiments apply enhancement processing to the sonar data samples such that the sonar images assembled from the data are sharper and have better definition yet do not include similarly enhanced sonar artifacts, which would otherwise distract or obscure actual features in the acoustic returns.

Furthermore, embodiments can be applied to any sonar data, independently of transducer orientation, transducer shape, chirp or non-chirp transmission and/or processing, and/or whether the transducer includes a single element or a phased or non-phased array of elements. This means that the embodiments described herein may encompass numerous sonar types, functions, and applications, including, but not limited to, side scan, forward look, and downward facing sonar system applications.

For example, in one embodiment, the enhancement processing may include applying a 3×3 or other size kernel edge enhancement filter to arrays of sonar data samples. Such filter may be applied to individual sonar data samples based on various conditional requirements that mitigate noise enhancement, surface clutter enhancement, unnecessary data enhancement (e.g., sonar data samples that are already significantly different from adjacent sonar data samples), and/or other unnecessary or unwanted enhancement of features in the sonar data samples. In some embodiments, the enhancement processing can be applied on the fly by logic devices in the sonar transducer assembly (e.g., by co-controller 222 of sonar transducer assembly 210) so no additional processing is required from a display processor (e.g., controller 220 and/or user interface/controller 120/130).

In various embodiments, the sonar data sample enhancement algorithm may be performed after or during other analog and/or digital sonar data sample processing, including analog to digital conversion (e.g., performed by receivers 232 and/or transceiver 234 and/or co-controller 222) and before image generation processes (e.g., performed by controller 220 and/or user interface/controller 120/130). For example, transmitter 230 and/or transceiver 234 may provide transmission signals to corresponding transducers/channels 260 and/or 264 to generate one or more acoustic beams, and receivers 232 and/or transceiver 234 may receive corresponding acoustic returns from transducers/channels 260 and/or 264, which are then processed (e.g., low-pass or otherwise filtered, amplified, basebanded, decimated, multichannel processed, and/or otherwise processed using analog and/or digital signal processing) and/or converted by receivers 232 and/or transceiver 234 and/or co-controller 222 to produce an array of time differentiated sonar data samples for each acoustic return and/or channel/transducer.

In some embodiments, the sonar data samples may be time differentiated (e.g., sampled at a series of sample times) relative to a transmission time of a corresponding acoustic beam, which may or may not incorporate a known delay from the transmission time to account for, for example, transmission pulse length, system recovery, and/or other sources of sonar interference. The series of sample times may in some embodiments be equally spaced from one another, for example, or may be spaced differently according to one or more desired system resolutions at one or more ranges of depths, for example.

In various embodiments, the output of receivers 232 and/or transceiver 234 and/or co-controller 22 may include an array of time differentiated sonar data samples representing the amplitudes of acoustic returns corresponding to a single acoustic beam or transmission signal, for example, or a plurality of acoustic beams if averaging between transmissions is performed to reduce the effective background noise level in the array of sonar data samples. The format of the sonar data samples may provide such amplitudes on a linear or logarithmic scale (e.g., in linear or logarithmic units).

In some embodiments, receivers 232 and/or transceiver 234 may be configured to provide the arrays of time differentiated sonar data samples to co-controller 222, which may be configured to process the arrays to enhance the sonar data samples, as described herein. In other embodiments, co-controller 222 may be configured to receive analog signals from receivers 232 and/or transceiver 234 corresponding to received acoustic returns, convert the analog signals into the arrays of time differentiated sonar data samples, and process the arrays to enhance the sonar data samples. In various embodiments, co-controller 222 may be configured to provide the enhanced arrays of time differentiated sonar data samples to controller 220, which may be configured to generate sonar image data and/or one or more sonar images from the enhanced arrays or to convey the enhanced arrays to user interface 120 and/or controller 130 for conversion to one or more sonar images and/or rendering on a display of user interface 120 for display to a user.

Processing the time differentiated sonar data samples may in some embodiments be conducted in two stages: one or more cleaning stages to remove unwanted sonar artifacts such as noise, interference, surface clutter, and/or other sonar artifacts; and an enhancement stage to apply a sonar data sample enhancement algorithm. For a phased or non-phased array of transducers, individual acoustic returns or channels, or combinations of acoustic returns or combinations of the channels may be passed through one or both stages.

In some embodiments, application of cleaning stages may be user selectable or otherwise optional, but in general the highest quality sonar imagery is generated by removing sonar artifacts either prior or subsequent to applying an enhancement algorithm. Removal of sonar artifacts may include one or more or combinations of acoustic return averaging, interference detection and/or rejection, surface clutter detection and/or rejection, and/or other noise or sonar artifact detection and/or rejection, for example. In some embodiments, removal of sonar artifacts may include implementing one or more or combinations of similar filtering and/or processing described in U.S. patent application Ser. No. 14/261,316 filed Apr. 4, 2014 and entitled "WIDEBAND SONAR RECEIVER AND SONAR SIGNAL PROCESSING ALGORITHMS", which is hereby incorporated by reference in its entirety.

The enhancement stage of the processing accepts as input arrays of sonar data samples, which may in some embodiments be pre-processed by one or more cleaning stages, and may be configured to compile the arrays of sonar data samples into a data buffer implemented with a size facilitating a selected and/or enabled type of enhancement processing (e.g., a three array buffer would facilitate 3×3 edge enhancement processing, for example). In some embodiments, the individual elements of the arrays of sonar data samples may be temporally and/or spatially aligned (e.g., using corresponding orientation and/or position sensor data) before entering either or both the cleaning stages and the enhancement stage of the processing. In some embodiments, many multiples of arrays can be buffered based on the amount of processing capability available and a desired enhancement quality or characteristic. Furthermore, the number and/or pattern of adjacent sonar data samples (e.g., within the array and/or within adjacent arrays) may be selected and/or enabled to facilitate a particular type, level, or quality of enhancement processing.

For example, if three arrays of sonar data samples are buffered, the enhancement processing may including determining, for each element in an output array of enhanced time differentiated sonar data samples, a weighted sum of a corresponding sample in a middle array and two or more adjacent samples in the middle array and/or the two adjacent arrays. More generally, the kernel of the weighted sum may be any combination of an n by m array (e.g., or an n by m by p matrix if the sonar system includes two or more spatially differentiated and/or synchronous transducer elements) of sonar data samples, and the resulting weighted sum may be placed in an element of the enhanced array corresponding to any one of the elements of the kernel (e.g., typically the element corresponding to the centroid element of the kernel). For example, the kernel may be a 3×3 array and the weighted sum may be placed in the element of the enhanced array corresponding to the center element of the kernel. Other kernel patterns are contemplated, such as 1×3 (e.g., all samples within a single array), 3×1 (each sample from a different but adjacent array), 5×5 (requiring buffering at least portions of five arrays), and/or other kernel sizes and/or patterns. Furthermore, such buffering may take place prior to the cleaning stages described herein, and the cleaning stage processing may be applied to sonar data samples within the buffer.

In some embodiments, the enhancement stage may include optional sub-stages configured to detect high contrast samples and/or sonar artifacts (e.g., surface clutter, samples with values/amplitudes beneath a background noise level) and omit them from the enhancement processing. For example, the enhancement stage may be configured to omit such samples from the remaining enhancement processing by setting the weights of all adjacent samples to zero, for example, or setting the element of the enhanced array equal to the corresponding sample in the array being processed. In such embodiments, high contrast samples may be detected by comparing the instant sample in the array being processed to one or more adjacent samples (e.g., the samples corresponding to one or more elements in the selected kernel defining the weighted sum) and determining if the extent of the compared sample values (e.g., max and min) is equal to or greater than a selected and/or enabled contrast threshold. If the extent of the compared sample values is equal to or greater than the selected and/or enabled contrast threshold, then the instant sample is deemed to have sufficient contrast and is omitted from the remaining enhancement processing, as described herein.

Figure 3:
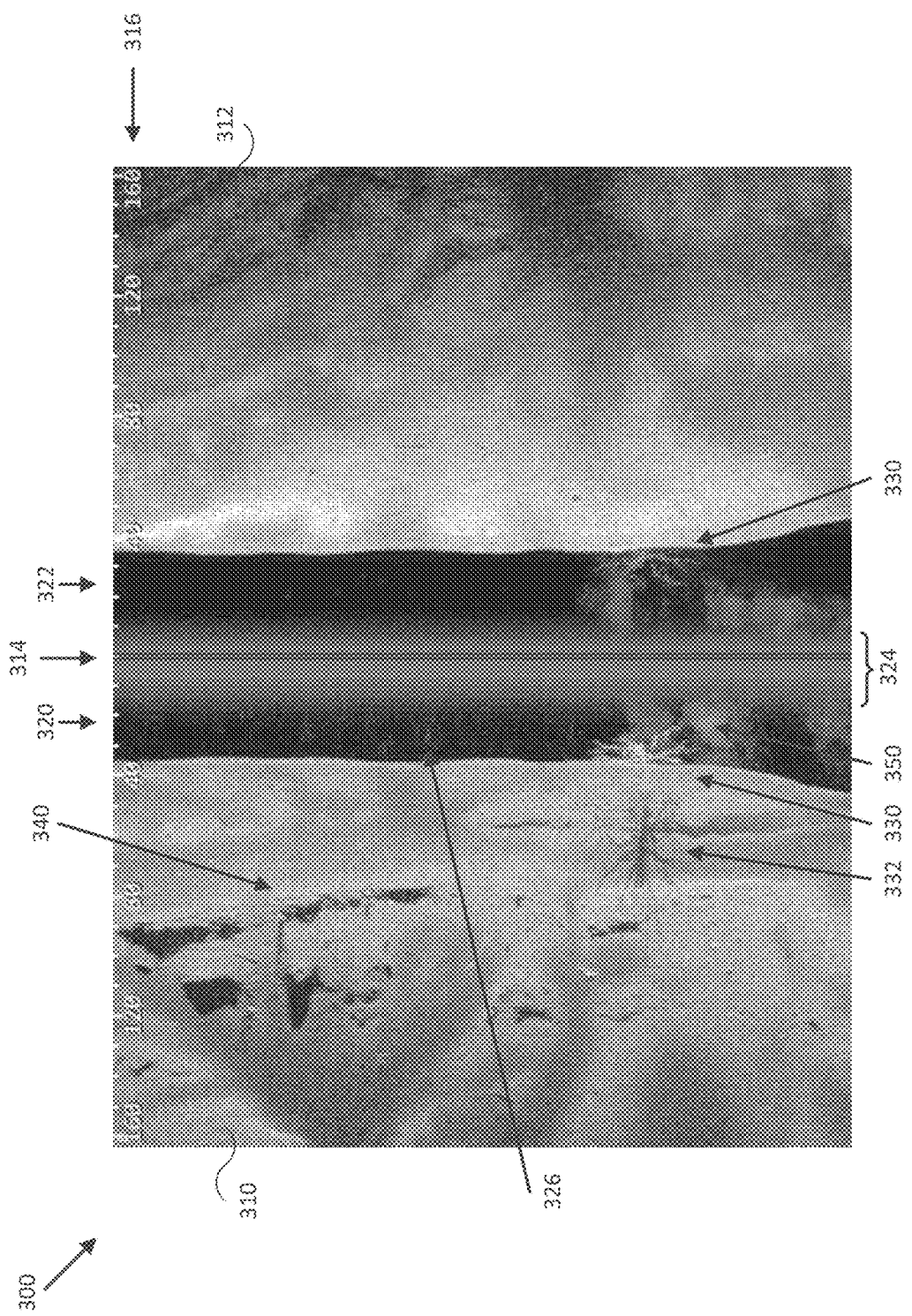
FIGS. 3-6 illustrate various display views generated by a sonar system in accordance with embodiments of the disclosure.
Figure 4:
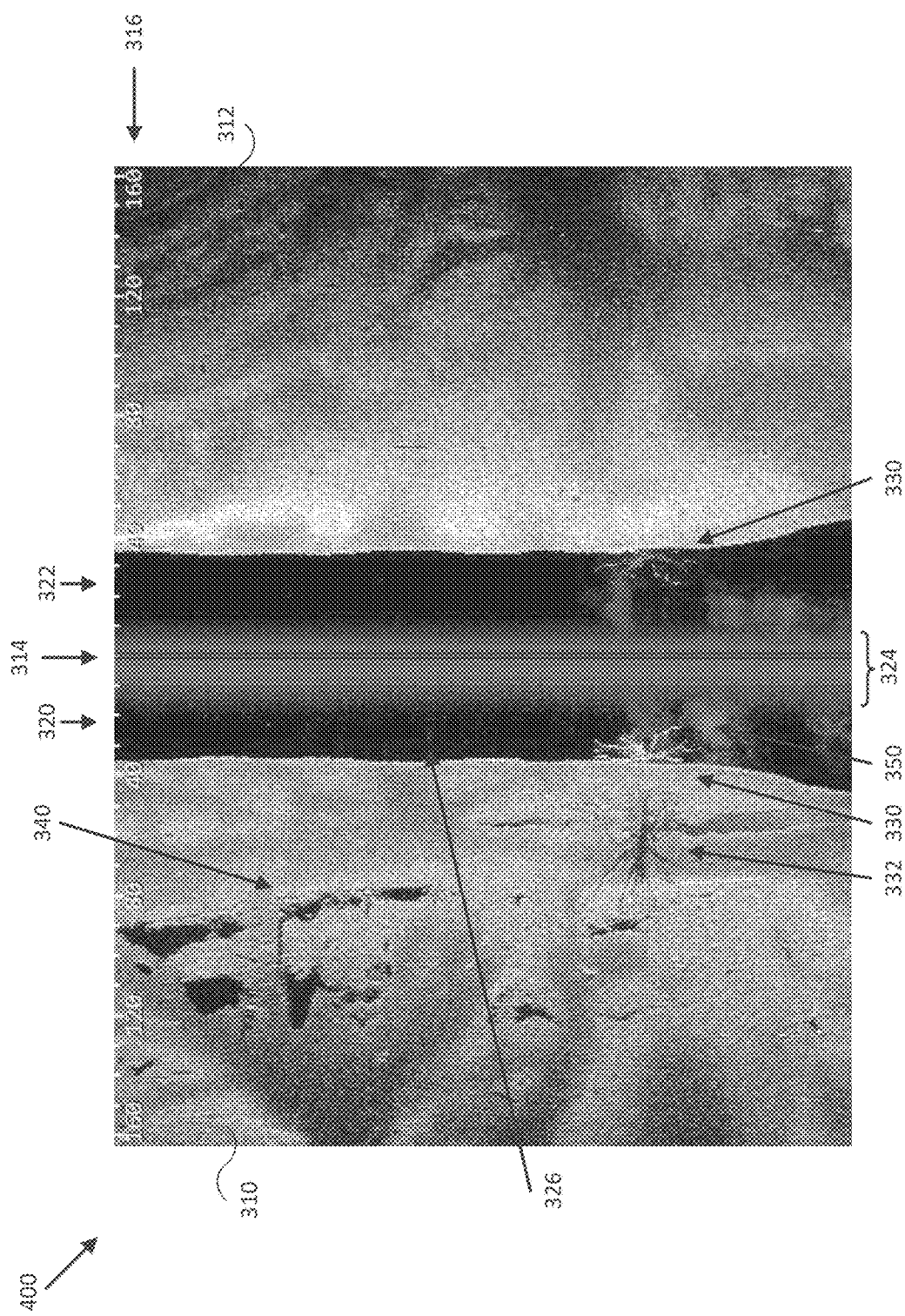

FIGS. 3 and 4 illustrate display views 300 and 400 generated by a sonar system in accordance with embodiments of the disclosure, where display view 300 corresponds to a sonar image generated from arrays of non-enhanced sonar data samples and display view 400 corresponds to a sonar image generated from arrays of enhanced sonar data samples. In particular, display view 300 of FIG. 3 includes port and starboard sonar images 310 and 312 corresponding to acoustic returns received by port and starboard transducers arranged in a side view configuration. For example, a single array of time differentiated sonar data samples from a port transducer may be used to generate a line of image pixels from center track 314 to a left edge of port sonar image 310, and a time series of such lines of image pixels may be aggregated into the full port sonar image 310. User interface/controller 120/130 and/or controller 220 may be configured to generate such lines of image pixels from arrays of sonar data samples through interpolation, compression, blending, and/or other image processing.

As shown in FIG. 3, display view 300 also includes features typical of images generated from side view sonar systems, such as center track 314 (e.g., generally corresponding to the track of a coupled mobile structure) and port and starboard water columns 320 and 322 (e.g., the respective water columns between the corresponding sonar transducer element and the floor of the body of water). When rendered for display to a user, user interface/controller 120/130 and/or controller 220 may be configured to include one or more indicators corresponding to various characteristics of the sonar system, the sonar images, the environmental conditions, and/or other characteristic or parameters related to operation of sonar system 110 and/or mobile structure 101, for example, such as depth indicator 316.

Also shown in display view 300 are various sonar features such as a tree 330 (shown partially in both port and starboard sonar images 310 and 312), its tree shadow 332, a bottom ledge 340 along the bottom on the port side, and a water column feature 350 (e.g., which may correspond to one or more of a suspended weed, leaves of tree 330, a school of fish, and/or other water column features resolvable by sonar). In some embodiments, portions of water columns 320 and 322 may include various sonar artifacts, such as background noise (e.g., shown throughout display view 300), interference 326, and/or surface clutter region 324 caused by cavitation and/or other sources of water column disruption/noise and/or sonar artifacts near the surface of the body of water, and surface clutter region 324 may partially or completely obscure sonar features in water columns 320 and 322 similar to water column feature 350. Embodiments of the methods and systems disclosed herein may be configured to enhance sonar data samples substantially without enhancing sonar artifacts such as the background noise, interference 326, and/or surface clutter region 324 shown in display view 300.

FIG. 4 shows and example of a display view 400 where sonar features are enhanced substantially without enhancing such sonar artifacts. For example, in comparing display view 400 to display view 300, tree 330, tree shadow 332, ledge 350, and water column feature 350 are all presented with increased definition and are easier to distinguish and recognize in display view 400, yet the overall background noise, interference 326, and surface clutter region 324 are either substantially unchanged (e.g., surface clutter region 324) or absent (e.g., interference 326) from display view 400. In particular, tree shadow 332 and the shadow of ledge 340 are better defined and are presented with more distinct edges, which helps a user interpret and/or recognize corresponding features in display view 400. Furthermore, the bottom of the body of water shown in port and starboard sonar images 310 and 312 also includes greater contrast between different levels of acoustic returns from the bottom, which can help distinguish a soft muddy bottom from a weedy water column feature or bottom and/or a hard bottom. Such detailed information can help a user and/or an autopilot navigate a body of water by presenting a more reliable indication of the risk of weed entanglement and/or bottom collision, for example.

Figure 5:
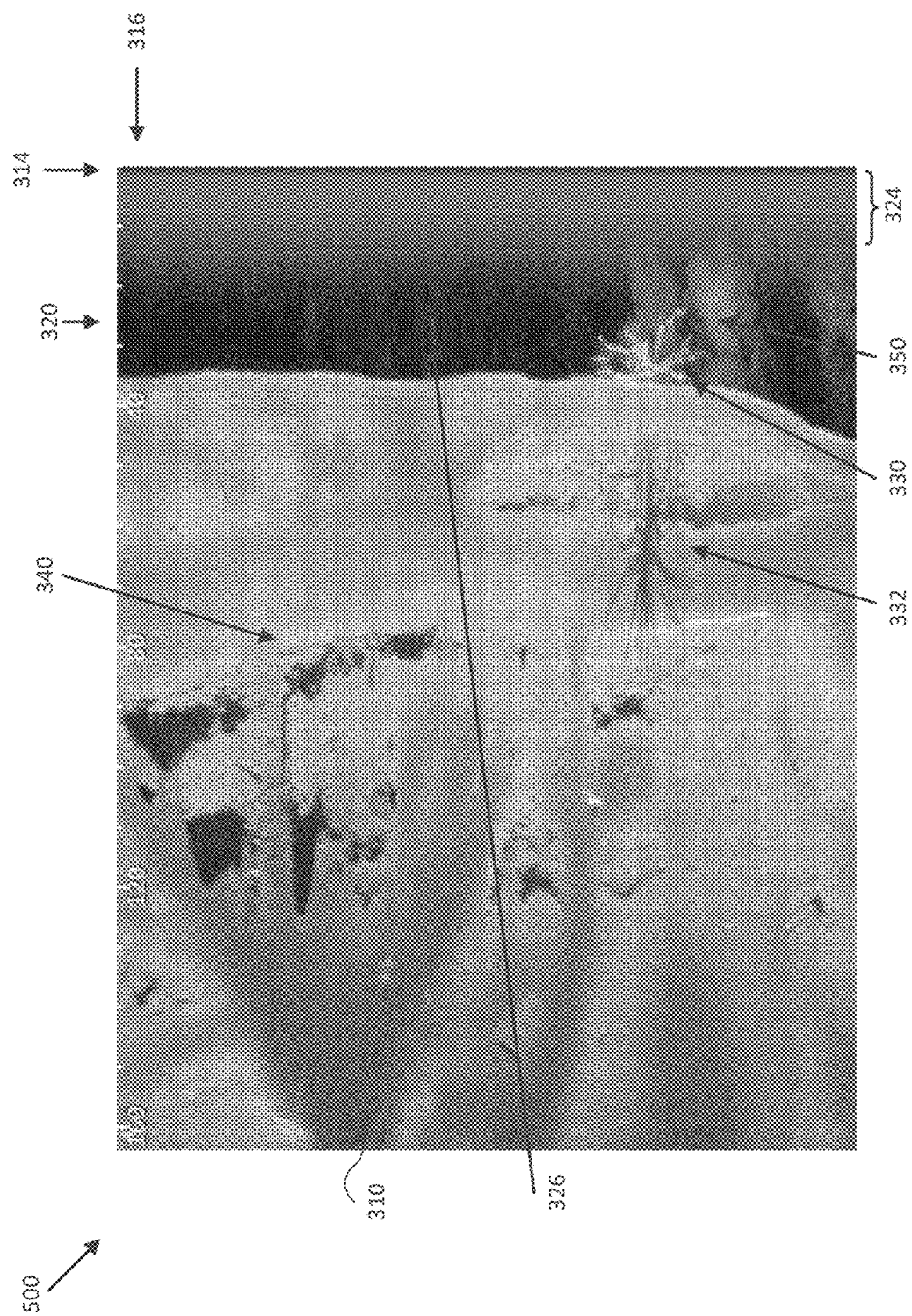
Figure 6:
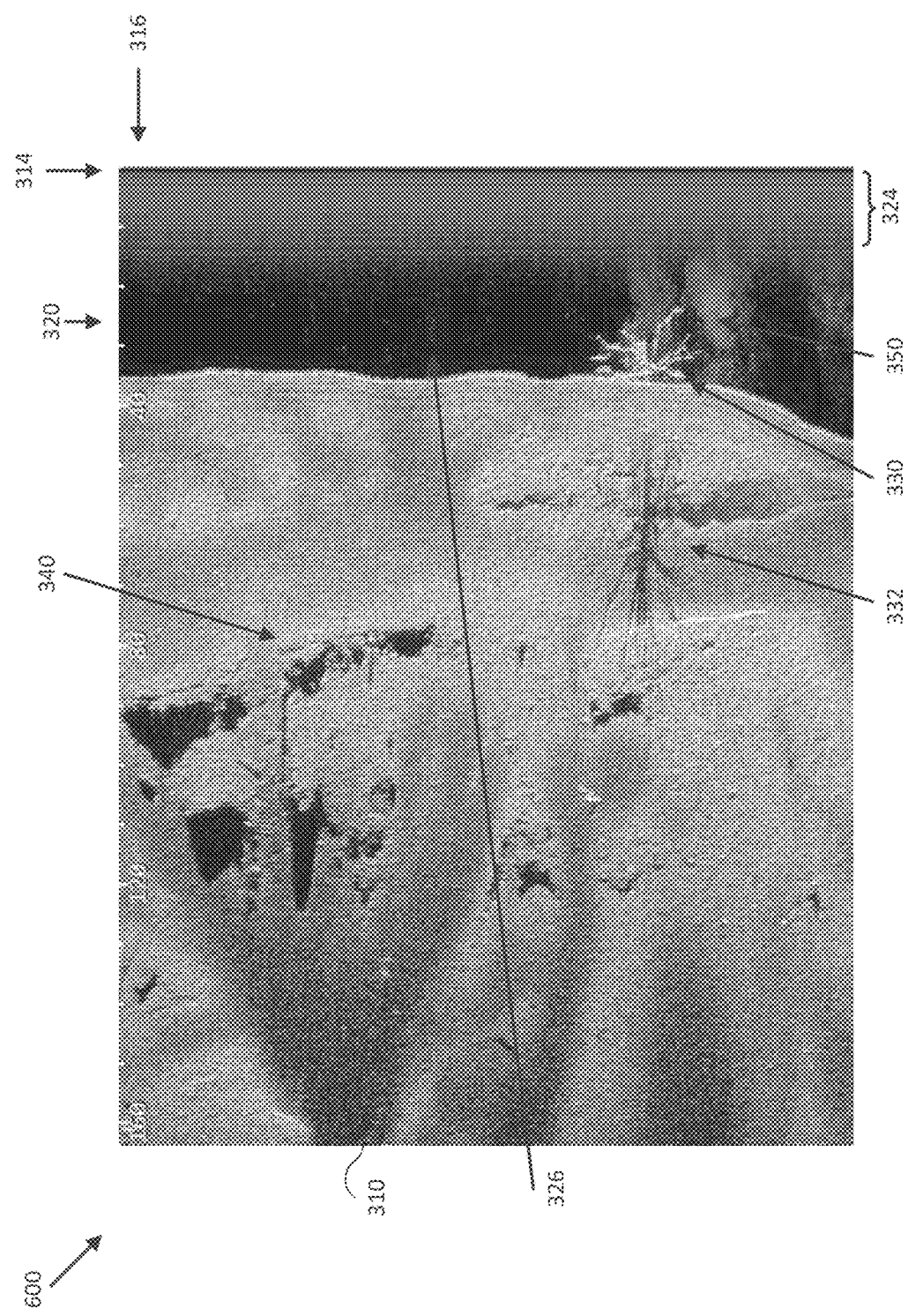

FIGS. 5 and 6 illustrate display views 500 and 600 generated by a sonar system in accordance with embodiments of the disclosure, where display view 500 corresponds to a scaled version of port sonar image 310 of display view 300, and where display view 600 corresponds to a scaled version of port sonar image 310 of display view 400 that has been generated from sonar data samples enhanced using the methodologies disclosed herein. For example, comparing display view 600 to display view 500, it can be more clearly seen that sonar features, such as tree 330, shadow 332, ledge 340, water column feature 350, and/or the general surface texture of the bottom or floor of the body of water, are enhanced substantially without enhancing sonar artifacts, such as interference 326, surface clutter region 324, and/or the general background noise. In addition, because embodiments of the present disclosure perform enhancement processing on the sonar data samples themselves, an image processor generating display view 600 (e.g., user interface 120) would not be required to re-apply such processing when scaling from display view 300 to display view 600, for example.

Figure 7A:
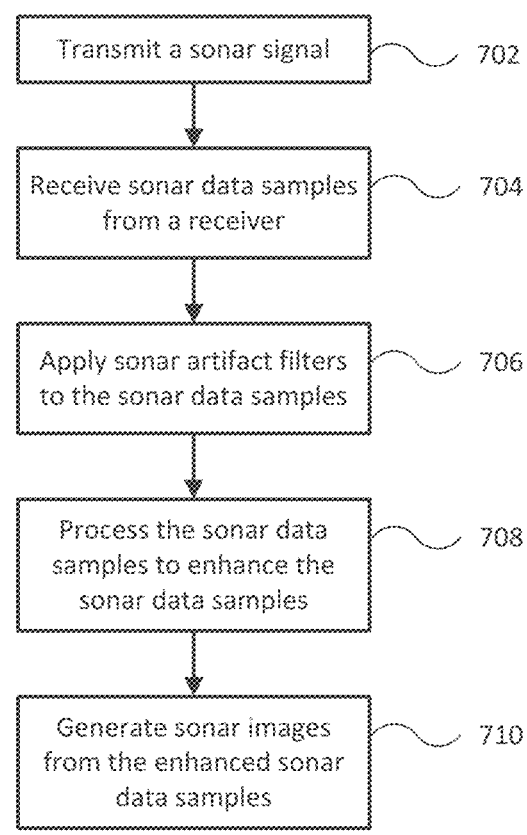
FIGS. 7A, 7B, and 7C illustrate flow diagrams of various operations to operate a sonar system in accordance with an embodiment of the disclosure.
Figure 7B:
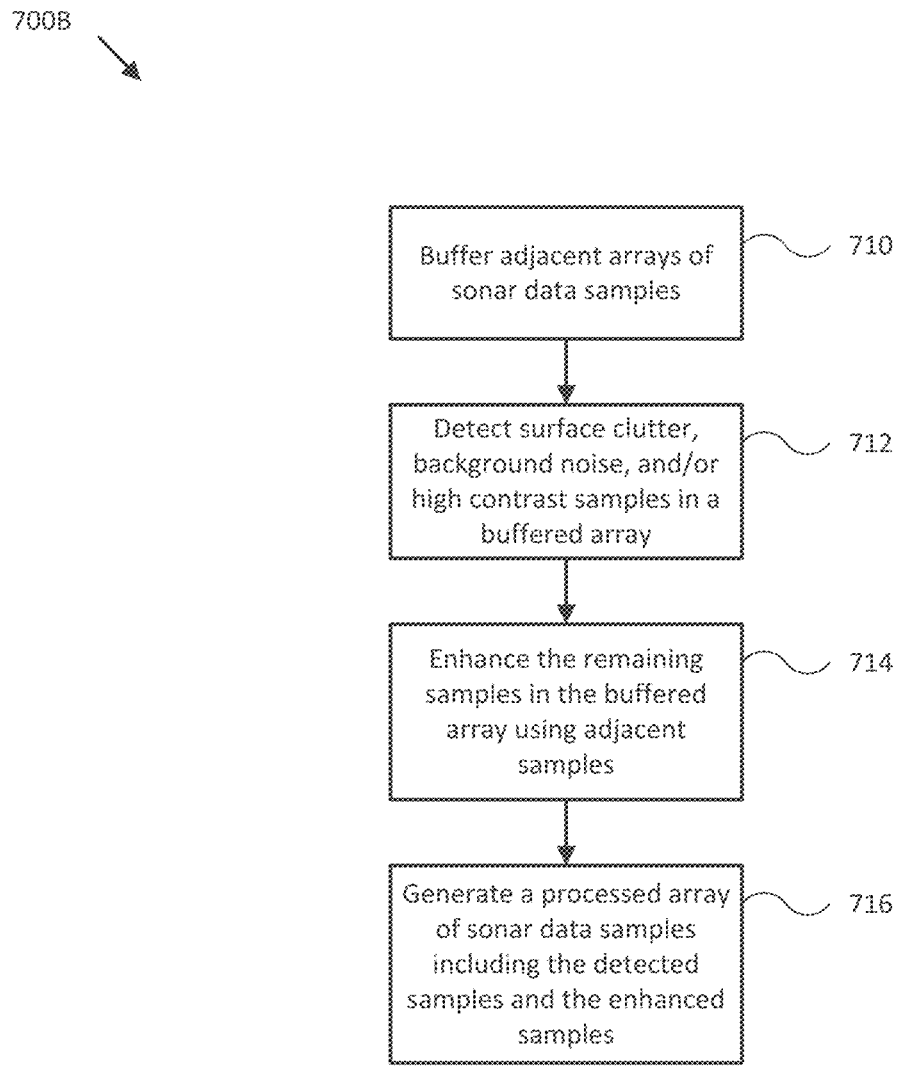
Figure 7C:
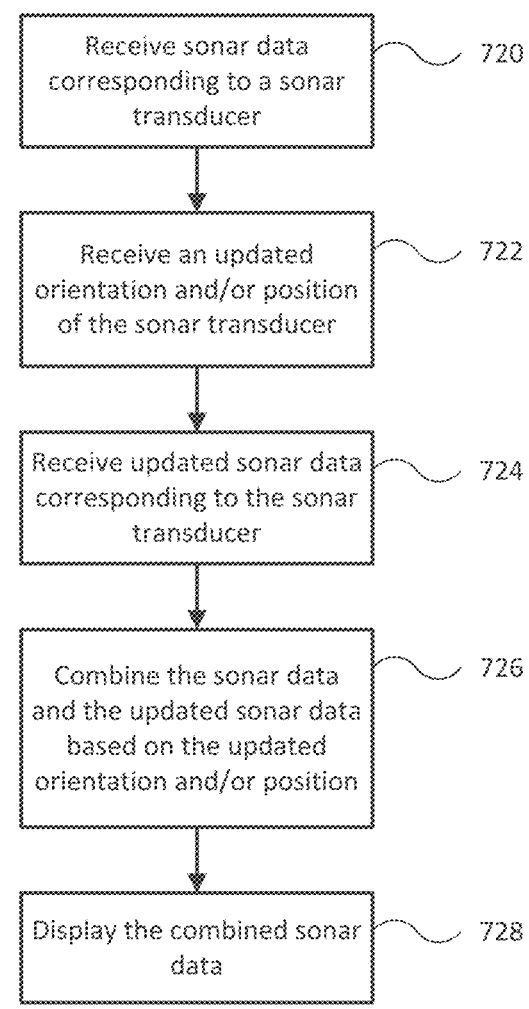

FIGS. 7A-C illustrate flow diagrams of respective processes 700A, 700B, and 700C to provide sonar data and/or imagery for mobile structure 101 in accordance with embodiments of the disclosure. In some embodiments, the operations of FIGS. 7A-C may be implemented as software instructions executed by one or more logic devices associated with corresponding electronic devices, sensors, and/or structures depicted in FIGS. 1A through 2. More generally, the operations of FIGS. 7A-B may be implemented with any combination of software instructions and/or electronic hardware (e.g., inductors, capacitors, amplifiers, actuators, or other analog and/or digital components).

It should be appreciated that any step, sub-step, sub-process, or block of processes 700A, 700B, and 700C may be performed in an order or arrangement different from the embodiments illustrated by FIGS. 7A-C. For example, in other embodiments, one or more blocks may be omitted from the various processes, and blocks from one process may be included in another process. Furthermore, block inputs, block outputs, various sensor signals, sensor information, calibration parameters, and/or other operational parameters may be stored to one or more memories prior to moving to a following portion of a corresponding process. Although processes 700A, 700B, and 700C are described with reference to systems 100, 100B, and/or 200 and FIGS. 1A-2, processes 700A, 700B, and 700C may be performed by other systems different from those systems and including a different selection of electronic devices, sensors, assemblies, mobile structures, and/or mobile structure attributes.

Process 700A represents a method for providing sonar data and/or imagery using systems 100, 100B, and/or 200 in accordance with embodiments of the disclosure. At the initiation of process 700A, various system parameters may be populated by prior execution of a process similar to process 700A, for example, or may be initialized to zero and/or one or more values corresponding to typical, stored, and/or learned values derived from past operation of process 700A, as described herein.

In block 702, a logic device transmits a sonar signal. For example, controller 220 and/or co-controller 222 of transducer assembly 210 may be configured to control transmitter 230 to provide a transmission signal to transmission channel 260 of multichannel transducer 250 and produce a corresponding acoustic beam. In some embodiments, controller 220 and/or co-controller 222 may be configured to control transceiver 234 to provide transmission signal to transducer 264 and produce a corresponding acoustic beam. In various embodiments, transducer assembly 210 may be configured to use temperature sensor 266 and/or orientation/position sensor 240 to record corresponding measurements at substantially the same time. Notification of transmission and/or other sensor information may be relayed to other devices of system 100 through a wired or wireless communications link established through use of I/O port 214 and/or wireless communications module 270.

In block 704, a logic device receives sonar data samples from a receiver. For example, controller 220 and/or co-controller 222 may be configured to control one or more of receivers 232 to receive acoustic returns from one or more of receive channels 262 of multichannel transducer 250, for example, and provide corresponding arrays of time differentiated sonar data samples to co-controller 222. In other embodiments, controller 220 and/or co-controller 222 may be configured to control transceiver 234 to receive acoustic returns from transducer 264 and provide corresponding arrays of time differentiated sonar data samples to co-controller 222. In some embodiments, receivers 232 and/or transceiver 234 may be configured to convey the acoustic returns to co-controller 222 over a baseband channel and co-controller 222 may be configured to convert the acoustic returns into arrays of sonar data samples. In other embodiments, receivers 232, transceiver 234, and/or co-controller 222 may be configured to decimate the acoustic returns before performing further processing. In various embodiments, transducer assembly 210 may be configured to use temperature sensor 266 and/or orientation/position sensor 240 to record corresponding measurements at substantially the same time as each or any one of the time differentiated sonar data samples.

In block 706, a logic device optionally applies sonar artifact filters to sonar data samples. For example, controller 220 and/or co-controller 222 may be configured to apply one or more of a noise reduction or rejection filter, an interference rejection filter, a surface clutter rejection filter, and/or other sonar artifact reduction or rejection filters to the arrays of sonar data samples received in block 704. In some embodiments, block 706 may instead be performed after block 708 and controller 220 and/or co-controller 222 may be configured to apply various sonar artifact filters to processed arrays of enhanced sonar data samples provided by block 708.

In block 708, a logic device processes sonar data samples to enhance the sonar data samples. For example, controller 220 and/or co-controller 222 may be configured to process the arrays of time differentiated sonar data samples provided by blocks 704 and/or 706 to provide processed arrays of time differentiated enhanced sonar data samples. In some embodiments, such processing may take the form of generating a weighted sum of a sample in a received array and at least two adjacent samples in the received array and/or adjacent received arrays. For example, where only a single array or portion of an array is buffered, the weighted sum may be implemented to sum an instant sample with two adjacent samples within the same array according to weights selected to emphasize a particular aspect of the sonar data, such as sample response edge, intra-sample contrast, overall definition, dynamic range, and/or other sonar data characteristics. In other embodiments, multiple arrays may be buffered and the kernel of the weighted sum may be expanded to include one or more levels of adjacent sonar data samples in adjacent arrays. In some embodiments, controller 220 and/or co-controller 222 may be configured to use corresponding recorded temperature, orientation, and/or position measurements to align arrays of time differentiated sonar data samples with each other temporally and/or spatially before such buffering. In other embodiments, various multichannel processing may be applied to one or more of the received arrays before the enhancement processing.

In various embodiments, the enhancement processing may include various operations to substantially omit, reduce, and/or otherwise mitigate enhancement of sonar artifacts and/or high contrast samples in the sonar data samples. Examples of such operations are provided in FIGS. 7B and 8, where various sonar artifacts and/or high contrast samples are detected and omitted from the enhancement processing. Corresponding elements in a processed array of enhanced sonar sample data may be set to the originally received sonar sample data value, for example, or may be blended, averaged, and/or otherwise temporally or spatially averaged to reduce or eliminate the sonar artifact. Using such mitigation processing, embodiments of the present disclosure may be configured to enhance arrays of time differentiated sonar data samples substantially without enhancing sonar artifacts in the time differentiated sonar data samples, Resulting processed arrays of enhanced time differentiated sonar data samples may be relayed to other devices of transducer assembly 210 and/or system 100 (e.g., user interface 120) through one or more wired and/or wireless communication links.

In block 710, a logic device generates sonar images from enhanced sonar data samples. For example, controller 220, co-controller 222, and/or user interface/controller 120/130 may be configured to generate one or more two dimensional and/or three dimensional sonar images from the processed arrays of enhanced time differentiated sonar data samples provided in block 708. Such images may then be provided to user interface 120 for aggregation and/or display to a user according to one or more display views. In some embodiments, controller 220, co-controller 222, and/or user interface/ controller 120/130 may be configured to use corresponding recorded temperature, orientation, and/or position measurements to align sonar images with each other temporally and/or spatially before such display.

Once the sonar images are generated, aggregated, and/or aligned, user interface 120 may be configured to render the images on a display. In some embodiments, sonar system 110 may be configured to display sonar data, imagery, display views, and/or other sensor information to a user through use of user interface 120, for example, such as receiving user selection of a desired display view (e.g., and/or other system parameters) and then relaying corresponding sonar data and/or imagery to user interface 120. In other embodiments, such images may be analyzed by an autopilot (e.g., implemented within controller 130, for example) and used to navigate mobile structure 101.

Process 700B represents a method for enhancing sonar data samples using systems 100, 100B, and/or 200 in accordance with embodiments of the disclosure. At the initiation of process 700B, various system parameters may be populated by prior execution of a process similar to process 700B, for example, or may be initialized to zero and/or one or more values corresponding to typical, stored, and/or learned values derived from past operation of process 700B, as described herein.

In block 710, a logic device butlers adjacent arrays of sonar data samples. For example, controller 220 and/or co-controller 222 of transducer assembly 210 may be configured to buffer one, three, or more arrays of sonar data samples provided in blocks 704 and/or 706 of FIG. 7A, In some embodiments, such buffering can be selected and/or enabled based on user selection of a type of enhancement processing, for example, corresponding to a desired or expected kernel size for such enhancement processing.

In block 712, a logic device detects surface clutter, background noise, and/or high contrast samples in a buffered array. For example, controller 220 and/or co-controller 222 of transducer assembly 210 may be configured to detect surface clutter, background noise, high contrast samples, and/or other sonar artifacts in the arrays of sonar data samples buffered in block 710. In various embodiments, each detection may be selected and/or enabled by user selection of a system parameter, for example.

In embodiments where background noise detection is enabled, a corresponding background noise level may be selected and/or adjusted by user input (e.g., provided to user interface 120) or determined from noise analysis and/or training based on a series of arrays of sonar data samples over time. All samples with values or levels less than the background noise level may be considered sonar artifacts (e.g., part of the overall background noise) and may be omitted from further enhancement processing.

In embodiments where surface clutter detection is enabled, a corresponding surface clutter region (e.g., corresponding to a range of depths beneath a transducer element) may be selected and/or adjusted by user input (e.g., provided to user interface 120) or determined from surface clutter analysis and/or training based on a series of arrays of sonar data samples over time. All samples within the surface clutter region may be considered sonar artifacts (e.g., obscured by surface clutter) and may be omitted from further enhancement processing.

In embodiments where high contrast sample detection is enabled, a corresponding desired enhancement level (e.g., corresponding to a maximum desired difference between values/levels of adjacent samples) may be selected and/or adjusted by user input (e.g., provided to user interface 120) or determined from dynamic range analysis and/or training based on a series of arrays of sonar data samples over time. All samples with levels/values sufficiently different from that of an adjacent sample (e.g., where the difference in values is equal to or more than the desired enhancement level) may be considered high contrast samples and may be omitted from further enhancement processing. In various embodiments, other detection operations may be implemented to detect and omit various other types of sonar artifacts and/or samples with various other sonar data characteristics from further enhancement processing, as described herein.

In block 714, a logic device enhances remaining samples in a buffered array using adjacent samples. For example, controller 220 and/or co-controller 222 may be configured to enhance the remaining samples (e.g., samples not considered to be sonar artifacts and/or high contrast samples) in an array of time differentiated sonar data samples buffered in block 710 using adjacent samples in the buffered array and/or adjacent arrays buffered in block 710. In one embodiment, as noted with respect to block 708 of process 700A, controller 220 and/or co-controller 222 may be configured to calculate or determine a weighted sum implemented to sum an instant sample with two or more adjacent samples according to weights selected to emphasize a particular aspect of the sonar data, such as sample response edge, intra-sample contrast, overall definition, dynamic range, and/or other sonar data characteristics. In various embodiments, the weights, the size and/or pattern of the kernel for the weighted sum, and/or other characteristics of the enhancement processing may be selected and/or enabled by user input (e.g., provided to user interface 120).

In block 716, a logic device generates a processed array of sonar data samples including detected samples and enhanced samples. For example, controller 220 and/or co-controller 222 may be configured to generate a processed array of sonar data samples including the sonar artifact and/or high contrast samples detected in block 712 and the remaining sonar data samples enhanced in block 714. In some embodiments, each element of the processed array corresponding to a detected sonar artifact or high contrast sample may be set equal to the value of the corresponding sample in the original array buffered in block 710. In other embodiments, each element of the processed array corresponding to a detected sonar artifact may be blended, averaged, and/or otherwise processed (e.g., using the corresponding sample and/or adjacent samples in the buffered arrays) to remove or reduce the sonar artifact. The remaining elements of the processed array may be set equal to the corresponding sonar data samples enhanced in block 714. Once the process array of enhanced sonar data samples is generated/assembled, one or more sonar images may be generated from the processed array, a described herein.

Process 700C represents a method for providing sonar data and/or imagery using systems 100, 100B, and/or 200 in accordance with embodiments of the disclosure. At the initiation of process 700C, various system parameters may be populated by prior execution of a process similar to process 700C, for example, or may be initialized to zero and/or one or more values corresponding to typical, stored, and/or learned values derived from past operation of process 700C, as described herein.

In block 720, a logic device receives sonar data (e.g., sonar data samples or sonar images) corresponding to a sonar transducer. For example, controller 220 of transducer assembly 210 may be configured to receive processed arrays of enhanced time differentiated sonar data samples or sonar images generated by co-controller 222, similar to the process described in process 700A. In various embodiments, controller 220 may be configured to receive an orientation and/or position of transducer assembly 210 with the sonar data.

In block 722, a logic device receives an updated orientation and/or position of a transducer. For example controller 220 may be configured to receive an absolute and/or relative orientation (e.g., roll, pitch, and/or yaw) and/or position from an orientation/position sensor integrated with transducer assembly 210 (e.g., orientation/position sensor 240) and/or assembly bracket/actuator 116. In various embodiments, the measured transducer orientation may be derived from one or more absolute and/or relative orientation measurements made by orientation sensors, actuators, stepper motors, and/or other devices coupled to transducer assembly 210 and/or mobile structure 101. In some embodiments, the updated measurements may be received substantially synchronously with processing of block 724.

In block 724, a logic device receives updated sonar data (e.g., sonar data samples and/or sonar images) corresponding to a transducer. For example controller 220 may be configured to receive updated sonar data samples and/or sonar images generated by co-controller 222 at a subsequent time relative to processing of block 720. In various embodiments, the updated sonar data may be generated using a process similar to process 700A.

In block 726, a logic device combines sonar data and updated sonar data based on an updated orientation and/or position. For example controller 220 may be configured to combine the sonar data samples or sonar images received in block 720 with the updated sonar data received in block 724 based on the updated orientation and/or position measurements received in block 722. In various embodiments, controller 220 may be configured to use the sensor measurements to align the sonar data samples or sonar image with the updated sonar data samples or updated sonar image and/or align both to a particular direction (e.g., down) accurately, as described herein. In some embodiments, controller 220 may be configured to align sonar images using common image detail. Resulting imagery may be two dimensional and/or three dimensional, as described herein.

In block 728, a logic device displays the combined sonar data. For example, controller 220 may be configured to provide the combined sonar data samples or sonar images to user interface 120 to display the combined data or images to a user of mobile structure 101. In some embodiments, controller 220 may be configured to render one or multiple different display views of the combined data, for example, and relay the display views and/or corresponding sonar images to user interface 120.

It is contemplated that any one or combination of methods to provide sonar data and/or imagery may be performed according to one or more operating contexts of a control loop, for example, such as a startup, learning, running, and/or other type operating context. For example, any of processes 700A-C may proceed back to an initial block and proceed through the corresponding process again to produce updated sonar data and/or imagery, as in a control loop.

Figure 8:
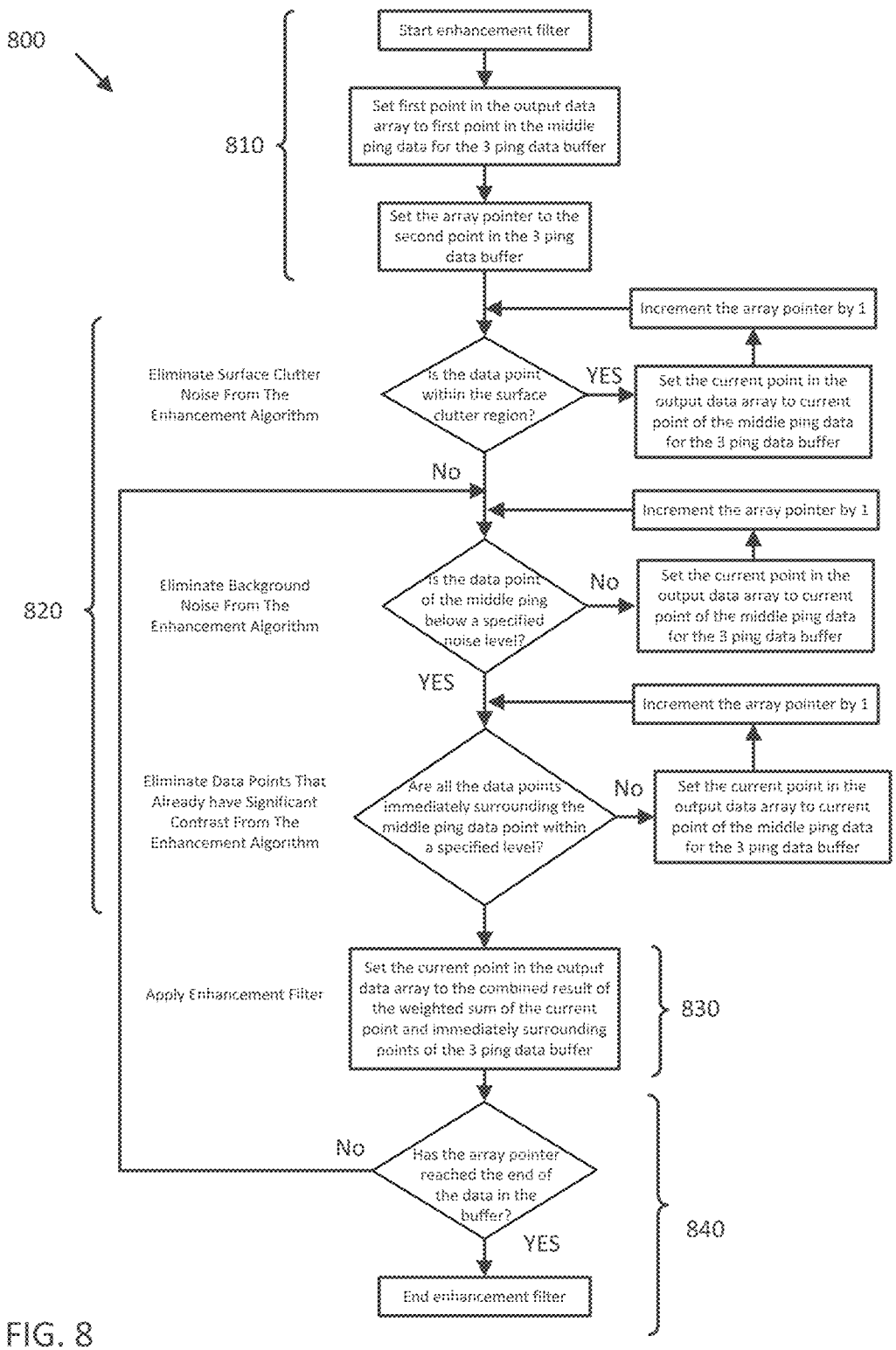
FIG. 8 illustrates a flow diagram of various operations to process sonar data samples in accordance with an embodiment of the disclosure.

FIG. 8 illustrates a flow diagram of process 800 to enhance sonar data samples in accordance with embodiments of the present disclosure. In some embodiments, the operations may be implemented as software instructions executed by one or more logic devices associated with corresponding electronic devices, sensors, and/or structures depicted in FIGS. 1A through 2. More generally, the operations of FIGS. 7A-B may be implemented with any combination of software instructions and/or electronic hardware (e.g., inductors, capacitors, amplifiers, actuators, or other analog and/or digital components). Any step, sub-step, sub-process, or block of processes 800 may be performed in an order or arrangement different from the embodiment illustrated by FIGS. 8. Although process 800 is described with reference to systems 100, 100B, and/or 200 and FIGS. 1A-2, process 800 may be performed by other systems including a different selection of electronic devices, sensors, assemblies, mobile structures, and/or mobile structure attributes.

At the initiation of process 800, various system parameters may be populated by prior execution of a process similar to process 800, for example, or may be initialized to zero and/or one or more values corresponding to typical, stored, and/or learned values derived from past operation of process 800, as described herein.

As shown in FIG. 8, portion 810 of process 800 corresponds to one or more initialization processes similar to block 710 of process 700B, including forming and indexing a buffer of arrays of time differentiated sonar data samples. Portion 820 corresponds to one or more sonar artifact and/or sonar characteristic (e.g., high contrast sample) detection and rejection/omission processes similar to block 712 of process 700B, including omitting detected samples by incrementing the array index to skip detected samples rather than process them according to a weighted sum. Portion 830 corresponds to an enhancement process similar to block 708 of process 700A and/or block 714 of process 700B, which may include calculating a weighted sum to determine an element of a processed array of enhanced sonar data samples. Portion 840 corresponds to one or more finalizing and/or termination processes configured to end process 800 with respect to a particular array of sonar data samples at least partially buffered in portion 810. Upon completion of process 800, a processed array of enhanced sonar data samples may be provided to a logic device for further processing.

Embodiments of the present disclosure can thus provide feature-filled, reliable, and accurate sonar systems, data and/or imagery. Such embodiments may be used to provide sonar data to assist in navigation and/or mapping for a mobile structure and/or to assist in the operation of other systems, devices, and/or sensors coupled to or associated with the mobile structure.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
   a sonar transducer assembly comprising a sonar transducer;
   a sonar receiver configured to receive acoustic returns from the sonar transducer and convert the acoustic returns into arrays of time differentiated sonar data samples; and
   a logic device adapted to communicate with the sonar receiver, wherein the logic device is configured to:
      receive the arrays of the time differentiated sonar data samples from the sonar receiver; and
      process the received arrays to enhance the time differentiated sonar data samples substantially without enhancing sonar artifacts in the time differentiated sonar data samples.

2. The system of claim 1, further comprising a user interface, wherein, the logic device is configured to:

generate one or more sonar images based, at feast in part, on the processed arrays of the enhanced time differentiated sonar data samples; and provide the one or more sonar images to the user interface for display.

3. The system of claim 1, wherein:

the sonar transducer assembly comprises an orientation and/or position sensor (OPS) disposed within the sonar transducer assembly; and the logic device is configured to process the received arrays based, at least in part, on orientation and/or position measurements provided by the OPS.

4. The system of claim 1, further comprising an actuator configured to adjust an orientation and/or position of the sonar transducer assembly, wherein the logic device is configured to:

receive a measured orientation and/or position of the sonar transducer assembly;

determine an orientation and/or position adjustment based, at least in part, on a desired orientation and/or position for the sonar transducer assembly and the measured orientation and/or position; and control the actuator to adjust the orientation and/or position of the sonar transducer assembly substantially to the desired orientation and/or position.

5. The system of claim 1, wherein:

the sonar transducer assembly comprises a housing; and the sonar receiver and the logic device are disposed substantially within the housing.

6. The system of claim 1, wherein:

the sonar transducer assembly comprises a wireless communications module disposed within the sonar transducer assembly; and the logic device is configured to transmit the processed arrays of enhanced time differentiated sonar data samples and/or corresponding sonar images wirelessly to a user interface using the wireless communications module.

7. The system of claim 1, further comprising a second transducer disposed within the sonar transducer assembly, wherein:

the second transducer comprises a linear transducer, a circular transducer, or a multichannel transducer; and the logic device is configured to:

transmit second transducer acoustic beams and/or receive second transducer acoustic returns using the second transducer; and generate one or more sonar images based, at least in part, on processed arrays of enhanced time differentiated sonar data samples corresponding to the second transducer acoustic beams and/or returns.

8. The system of claim 1, wherein the processing the received arrays comprises, for each received array:

generating a corresponding processed array of the enhanced time differentiated sonar data samples, wherein one or more elements of the processed array comprise a weighted sum of a corresponding sample in the received array and at least two adjacent samples in the received array and/or adjacent received arrays.

9. The system of claim 8, wherein:

the processing the received arrays comprises, for each received array, detecting high contrast samples and/or the sonar artifacts in the received array;

the high contrast samples are relative to a desired enhancement level; and each element of the processed array that corresponds to a detected high contrast sample and/or a detected sonar artifact comprises the corresponding sample in the received array.

10. The system of claim 1, wherein the processing the received arrays comprises:

applying one or more sonar artifact filters to the received arrays or to the processed arrays before generating one or more sonar images based, at least in part, on the processed arrays.

11. A method comprising:

receiving arrays of time differentiated sonar data samples;

processing the received arrays to enhance the time differentiated sonar data samples substantially without enhancing sonar artifacts in the time differentiated sonar data samples; and generating one or more sonar images based, at least in part, on the processed arrays of the enhanced time differentiated sonar data samples.

12. The method of claim 11, wherein the arrays are provided by a sonar receiver configured to receive acoustic returns from a sonar transducer and convert the acoustic returns into the arrays of the time differentiated sonar data samples, the method further comprising:

providing the one or more sonar images to a user interface for display.

13. The method of claim 11, further comprising:

processing the received arrays based, at least in part, on orientation and/or position measurements provided by an orientation and/or position sensor.

14. The method of claim 11, further comprising:

generating the one or more sonar images based, at least in part, on orientation and/or position measurements provided by an orientation and/or position sensor disposed within a sonar transducer assembly.

15. The method of claim 11, further comprising:

receiving a desired orientation and/or position for a sonar transducer from a user interface; and controlling an actuator to orient and/or position the sonar transducer substantially to the desired orientation and/or position.

16. The method of claim 1, further comprising:

receiving a measured orientation and/or position of a sonar transducer assembly, wherein the sonar transducer assembly is mounted to a watercraft, at least in part, through an actuator configured to adjust an orientation and/or position of the sonar transducer assembly;

determining an orientation and/or position adjustment based, at least in part, on a desired orientation and/or position for the sonar transducer assembly and the measured orientation and/or position; and controlling the actuator to adjust the orientation and/or position of the sonar transducer assembly substantially to the desired orientation and/or position.

17. The method of claim 1, wherein the arrays of time differentiated sonar data samples comprise first arrays of first time differentiated sonar data samples corresponding to a first sonar transducer, the method further comprising:

receiving second transducer acoustic returns corresponding to a second sonar transducer, wherein the second transducer comprises a linear transducer, a circular transducer, or a multichannel transducer; and generating the one or more sonar images based, at least in part, on processed arrays of enhanced time differentiated sonar data samples corresponding to the second transducer acoustic beams and/or returns.

18. The method of claim 11, wherein the processing the received arrays comprises, for each received array:

generating a corresponding processed array of the enhanced time differentiated sonar data samples, wherein one or more elements of the processed array comprise a weighted sum of a corresponding sample in the received array and at least two adjacent samples in the received array and/or adjacent received arrays.

19. The method of claim 18, wherein:

the processing the received arrays comprises, for each received array, detecting high contrast samples and/or the sonar artifacts in the received array;

the high contrast samples are relative to a desired enhancement level; and each element of the processed array that corresponds to a detected high contrast sample and/or a detected sonar artifact comprises the corresponding sample in the received array.

20. The method of claim 11, wherein the processing the received arrays comprises:

applying one or more sonar artifact filters to the received arrays or the processed arrays before generating the one or more sonar images.

\* \* \* \* \*

UNITED STATES PATENT AND TRADEMARK OFFICE
CERTIFICATE OF CORRECTION

| | | |
|---|---|---|
| PATENT NO. | : 10,444,354 B2 | Page 1 of 2 |
| APPLICATION NO. | : 15/638124 | |
| DATED | : October 15, 2019 | |
| INVENTOR(S) | : Paul Stokes and Philip Webb | |

It is certified that error appears in the above-identified patent and that said Letters Patent is hereby corrected as shown below:

In the Specification

In Column 2, Line 48, change "tiled May" to --filed May--.

In Column 5, Line 40, change "in some" to --In some--.

In Column 8, Line 2, change "data. samples," to --data samples,--.

In Column 9, Line 4, change "structure 101." to --structure 101--.

In Column 9, Line 55, change "fled Oct." to --filed Oct.--.

In Column 10, Line 56, change "steeling" to --steering--.

In Column 11, Line 6, change "ASIC)" to --(ASIC)--.

In Column 11, Line 57, change "using a. time" to --using a time--.

In Column 12, Line 47, change "angles positions" to --angles/positions--.

In Column 16, Line 34, change "sensor 142." to --sensor 142--.

In Column 17, Line 15, change "co-controller 22.2)" to --co-controller 222)--.

In Column 18, Line 47, change "receivers 232." to --receivers 232--.

In Column 20, Line 58, change "for actuators" to --for actuators)--.

In Column 21, Line 67, change "power. in" to --power. In--.

Signed and Sealed this
Twenty-fourth Day of November, 2020

Andrei Iancu
*Director of the United States Patent and Trademark Office*

CERTIFICATE OF CORRECTION (continued)
U.S. Pat. No. 10,444,354 B2

In Column 22, Line 46, change "antennas 272. and/or" to --antennas 272 and/or--.

In Column 30, Line 27, change "samples," to --samples.--.

In Column 31, Line 1, change "butlers" to --buffers--.

In Column 31, Line 5, change "Fig 7A," to --Fig 7A.--.

In the Claims

In Column 35, Line 1, change "at feast" to --at least--.

In Column 36, Line 42, change "claim 1" to --claim 11--.

In Column 36, Line 56, change "claim 1" to --claim 11--.